United States Patent
Chud

(10) Patent No.: US 10,725,763 B1
(45) Date of Patent: Jul. 28, 2020

(54) UPDATE AND ROLLBACK OF CONFIGURATIONS IN A CLOUD-BASED ARCHITECTURE

(71) Applicant: Amazon Technologies, Inc., Seattle, WA (US)

(72) Inventor: Andrew Christopher Chud, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 10 days.

(21) Appl. No.: 15/636,260

(22) Filed: Jun. 28, 2017

(51) Int. Cl.

| | | |
|---|---|---|
| *G06F 9/44* | (2018.01) | |
| *G06F 9/445* | (2018.01) | |
| *G06F 9/45* | (2006.01) | |
| *G06F 8/65* | (2018.01) | |
| *G06F 8/71* | (2018.01) | |
| *G06F 11/07* | (2006.01) | |
| *G06N 20/00* | (2019.01) | |

(52) U.S. Cl.
CPC .............. *G06F 8/65* (2013.01); *G06F 8/71* (2013.01); *G06F 11/0706* (2013.01); *G06F 11/076* (2013.01); *G06F 11/079* (2013.01); *G06F 11/0793* (2013.01); *G06N 20/00* (2019.01)

(58) Field of Classification Search
CPC .......... G06F 8/65; G06F 8/71; G06F 11/0706; G06F 11/076; G06F 11/079; G06F 11/0793; G06N 20/00
See application file for complete search history.

(56) References Cited

U.S. PATENT DOCUMENTS

| | | | | |
|---|---|---|---|---|
| 7,831,782 B1* | 11/2010 | Coulter | ............... | G06F 11/1471 711/159 |
| 7,877,630 B1* | 1/2011 | Favor | .................. | G06F 11/3636 714/20 |
| 8,103,910 B2* | 1/2012 | Blumrich | ............ | G06F 9/30072 714/19 |
| 8,719,809 B2* | 5/2014 | Gokhale | ................... | G06F 8/62 717/168 |
| 8,825,817 B1* | 9/2014 | Jaisinghani | ......... | H04L 41/0816 709/221 |
| 9,112,777 B1* | 8/2015 | Barclay | ............... | H04L 41/0803 |

(Continued)

OTHER PUBLICATIONS

Radhika Sukapuram, Enhanced Algorithms for Consistent Network Updates, 2015, pp. 184-190. https://ieeexplore.ieee.org/stamp/stamp.jsp?tp=&arnumber=7387425 (Year: 2015).*

(Continued)

*Primary Examiner* — Mongbao Nguyen
(74) *Attorney, Agent, or Firm* — Lee & Hayes, P.C.

(57) ABSTRACT

An updated version of a configuration of a computing resource may be rolled back to a previous version. The computing resource can include code for a function or the computing resource can be used to implement calls of an API. In some cases, the computing resource can be tagged to indicate that rollback functionality is applicable to the computing resource. The rollback to a previous version of code for a function or a previous version of an API may take place based on a rollback condition being satisfied that is related to error rates that take place when updated versions of a function or an API are utilized. The computing resource may be implemented in conjunction with a cloud-based storage system.

20 Claims, 15 Drawing Sheets

(56) References Cited

U.S. PATENT DOCUMENTS

| | | |
|---|---|---|
| 9,122,562 B1 | 9/2015 | Stickle |
| 9,471,610 B1* | 10/2016 | Long .................. G06F 17/30 |
| 9,652,306 B1 | 5/2017 | Wagner et al. |
| 9,733,921 B1 | 8/2017 | Saenz et al. |
| 9,753,718 B1* | 9/2017 | Carter .................. G06F 16/183 |
| 10,180,886 B2* | 1/2019 | Chen .................. G06F 16/27 |
| 2006/0282480 A1* | 12/2006 | Johnson .................. G06F 8/61 |
| 2008/0288819 A1* | 11/2008 | Heller, Jr. ............. G06F 9/3004 714/19 |
| 2011/0119526 A1* | 5/2011 | Blumrich .......... G06F 15/17381 714/16 |
| 2014/0040208 A1* | 2/2014 | Graefe ................ G06F 16/2343 707/648 |
| 2014/0366000 A1 | 12/2014 | Batabyal et al. |
| 2015/0227533 A1* | 8/2015 | Goldstein ........... G06F 16/2379 707/661 |
| 2015/0378716 A1* | 12/2015 | Singh .................... H04W 4/60 717/172 |
| 2016/0026452 A1 | 1/2016 | Dani et al. |
| 2016/0054994 A1* | 2/2016 | Sakamoto ............... G06F 8/751 717/120 |
| 2016/0132313 A1* | 5/2016 | Jaisinghani ............... G06F 8/65 717/175 |
| 2016/0170850 A1* | 6/2016 | Williams .............. G06F 3/0619 714/6.23 |
| 2016/0314161 A1* | 10/2016 | Wen .................... G06F 11/1469 |
| 2016/0378775 A1* | 12/2016 | Kandiraju ........... G06F 12/0246 711/103 |
| 2017/0031671 A1* | 2/2017 | Joshi ...................... G06F 8/654 |
| 2017/0034023 A1* | 2/2017 | Nickolov ............ H04L 43/0817 |
| 2017/0060562 A1* | 3/2017 | Lopez ...................... G06F 8/60 |
| 2017/0115978 A1 | 4/2017 | Modi et al. |
| 2017/0123804 A1* | 5/2017 | Abdallah .............. G06F 9/3005 |
| 2017/0153876 A1* | 6/2017 | Joglekar ................. G06F 8/315 |
| 2017/0180346 A1* | 6/2017 | Suarez ................ G06F 9/45558 |
| 2017/0344384 A1* | 11/2017 | Wadley .................. H04L 67/22 |
| 2017/0366586 A1 | 12/2017 | Bloesch et al. |
| 2017/0371724 A1 | 12/2017 | Wagner et al. |
| 2018/0004503 A1 | 1/2018 | OlmstedThompson |
| 2018/0018163 A1* | 1/2018 | Goetz .................... G06F 8/447 |
| 2018/0067811 A1* | 3/2018 | Mowatt ................ G06F 11/142 |
| 2018/0314597 A1* | 11/2018 | Zhang ................ G06F 11/1448 |

OTHER PUBLICATIONS

Daniel Sun, R2C: Robust Rolling-Upgrade in Clouds, 2016, pp. 1-14. https://ieeexplore.ieee.org/stamp/stamp.jsp?tp=&arnumber=7586059 (Year: 2015).*

Suhrid Satyal, Scalable Rollback for Cloud Operations using AI Planning, 2015, pp. 195-202. https://ieeexplore.ieee.org/stamp/stamp.jsp?tp=&arnumber=7365808 (Year: 2015).*

Wei Chen, MORE: A Model-driven Operation Service for Cloud-based IT Systems, 2016, pp. 633-640. https://ieeexplore.ieee.org/stamp/stamp.jsp?tp=&arnumber=7557508 (Year: 2016).*

Suhrid Satyal, Rollback Mechanisms for Cloud Management APIs Using AI Planning, 2017, pp. 148-160. https://ieeexplore.ieee.org/stamp/stamp.jsp?tp=&arnumber=7987057 (Year: 2017).*

Oscar Carlsson, Configuration Service in Cloud based Automation Systems, 2016, pp. 5238-5245. https://ieeexplore.ieee.org/stamp/stamp.jsp?tp=&arnumber=7793489 (Year: 2016).*

* cited by examiner

UPDATE AND ROLLBACK OF CONFIGURATIONS IN A CLOUD-BASED ARCHITECTURE

BACKGROUND

Computer-readable code is often updated to provide new versions of the code. Typically, the new versions of code maintain aspects of the previous versions, but make some modifications or additions. For example, the new versions of the code may fix problems that existed with previous versions of the code. In another example, new versions of code can also add functionality to previous versions of code. In a similar manner, new versions of application programming interfaces (APIs) can be provided that update the calls utilized to access data or to execute various functions.

However, in some situations, the execution of the updated versions of the code may not be as efficient as the execution of the previous versions of the code. To illustrate, the error rate for executions of an updated version of the code may be greater than for executions of a previous version of the code. Additionally, the error rate of API calls utilizing an updated version of an API may be greater than the error rate of API calls utilizing previous versions of the API. In these scenarios, the applications utilizing the updated versions of the code and/or API can experience increased latency and, in some instances, failure of requested operations. Further, the operation of end-user devices can be adversely affected by changes to configurations of computing resources implemented in a cloud-based architecture that provides services with respect to the end-user devices.

The disclosure made herein is presented with respect to these and other considerations.

DETAILED DESCRIPTION

Figure 1:
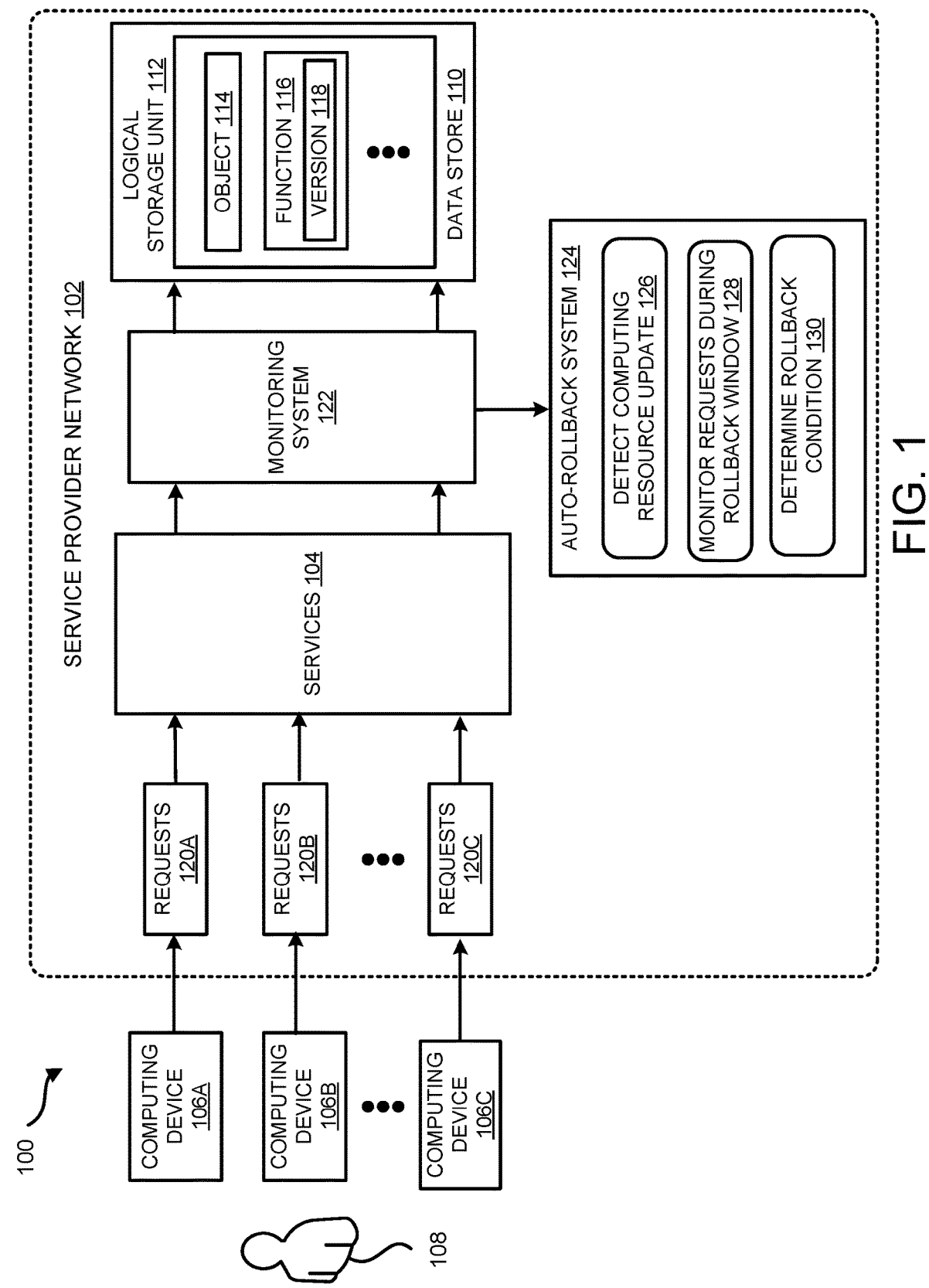
FIG. 1 is a diagram of an architecture to provide automated rollback of changes to configurations of computing resources when a rollback condition is satisfied, according to one particular configuration.

The following detailed description is directed to technologies for determining when an updated version of a configuration of a computing resource can be rolled back to a previous version of the configuration. The computing resources can include memory resources, processing resources, or both. The previous version of the configuration can be reinstated in response to detecting a rollback condition. The computing resources for which a configuration can be rolled back can be identified by a tag. In some cases, the tag can indicate a configuration of a computing resource that, when modified, could affect the operation of end-user devices. In certain implementations, a service provider network can provide one or more services to end-user devices on behalf of a customer of the service provider network. In these situations, updating a configuration of a computing resource that the service provider network is utilizing to implement a service on behalf of the customer can cause unexpected changes to or, in some cases, disruption of the service to the end-user devices. Rollback of the configuration of the computing resource to a previous version can restore the level of performance of the service to the end-user devices. Thus, the efficiency of utilization of the computing resource is improved, the overall number of computing resources utilized to implement the service on behalf of the customer decreases, and latency with respect to requests from the end-user devices decreases.

In particular implementations, an updated version of code for a function or an updated version of an API may be rolled back to a previous version. The rollback to a previous version of code for a function or a previous version of an API may take place based on a rollback condition being satisfied. In some cases, the rollback condition may indicate a threshold error rate in conjunction with the utilization of the updated version of the code of the function or the updated version of the API. The rollback condition may be determined, in some instances, by analyzing the error rates produced when utilizing previous versions of the code for the function or when utilizing previous API versions. The rollback condition may also be determined, based on input received from a user. The user may be a customer of a service provider that offers automated rollback of functions and APIs provided by customers of the service provider. The user may submit information related to a rollback condition via a user interface provided by the service provider. Additionally, machine learning techniques may be utilized to determine a rollback condition by analyzing a corpus of data related to error rates experienced with respect to the execution of various functions or with respect to the implementation of a number of APIs. In some configurations, the systems and methods described herein may be implemented in conjunction with an API development tool, a mobile application development tool, and/or a serverless computing environment. In addition, data and/or code utilized in the execution of functions or in the implementation of APIs may be stored in a cloud-based storage system.

In various configurations, a user may provide a new version of a function that is to be executed via the serverless computing environment. The function may include code that is executed to perform one or more operations specified by the function. The function can be executed in response to requests. The requests may be obtained from applications executed by computing devices, such as mobile device applications. In some examples, the requests may be generated in response to events or triggers experienced by or generated by the applications. Errors can occur with respect to requests obtained after updating the function. As the errors are experienced, the number of errors and/or the rate of errors may be compared with a rollback condition. The rollback condition may indicate a threshold number of errors or a threshold error rate. When a rollback condition has been satisfied, a previous version of the function may be executed in response to requests instead of the updated version. In this way, the latency caused by an increased error rate and the added computing resources utilized to deal with the increased error rate are minimized.

In particular implementations, the function being updated and rolled back may be provided by a customer of a service provider that implements the serverless computing environment. In other situations, the function being updated and rolled back may be provided by an administrator of the service provider. In these instances, the function may be utilized to implement features of a tool or system provided by the service provider. To illustrate, the administrator may provide one or more functions to implement the deployment or monitoring of a mobile device application created in conjunction with a mobile device application development tool provided by the service provider.

In the context of APIs, a user can provide an updated API that may specify calls to be utilized to access data and/or implement one or more functions. In some configurations, the updated API can include new and/or different calls from the calls of the previous version of the API. Also, the calls of the updated API may point to an updated version of a function. As requests are received that include calls of the updated API, an error rate for the requests and/or a number of requests experiencing an error can be compared to a rollback condition. When the rollback condition is satisfied, a service provider or customer of the service provider may generate a notification to users of the updated version of the API to utilize calls of the previous version of the API instead of the calls of the updated version of the API.

Additionally, in situations when a rollback condition has occurred, notifications can be sent to customers of the service provider that are associated with the updated version of a function or an updated version of an API. For example, the customers may receive an email or text message indicating that a rollback condition has occurred. In another example, an online dashboard or control panel of the customers may provide an alert indicating that a rollback condition has occurred.

In addition to minimizing the latency experienced due to increased error rates, the implementations described herein provide other technical benefits. For example, the techniques described herein may be implemented in non-conventional environments. To illustrate, rather than using a code deployment system to execute updated versions of a function, the implementations described in this application enable the execution of updated versions of a function directly in a serverless computing environment. Thus, the processing resources and the memory resources utilized by a conventional code deployment system are bypassed when directly utilizing a serverless computing environment to upload and execute updated versions of functions. Technical benefits other than those specifically mentioned herein can also be realized through an implementation of the disclosed technologies.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a diagram of an architecture 100 to provide automated rollback of changes to configurations of computing resources when a rollback condition is satisfied, according to one particular configuration. The architecture 100 can include a service provider network 102 that is a computing network configured to provide computing resources on a permanent or as-needed basis. Among other types of functionality, the computing resources provided by the service provider network 102 can be utilized to implement various types of network services. The computing resources provided by the service provider network 102 can include data processing resources like data storage resources, virtual machine ("VM") instances, networking resources, data communication resources, network services, and other types of computing resources.

The service provider network 102 can implement a number of services 104. The services 104 can be provided on behalf of customers of the service provider network 102. In various implementations, the services 104 can include at least one of an on-demand computing service, a serverless computing environment, a cryptography service, an authentication service, a policy management service, a deployment service, or a cloud-based alarm service. The services will be discussed in more detail with respect to FIGS. 2-15.

The services 104 can be accessed by computing devices 106A, 106B, 106C. The computing devices 106 can be associated with customers of the service provider network 102, in some cases. Additionally, at least a portion of the computing devices 106 can be operated by end-users, such as user 108, that are utilizing the services provided by the service provider network 102 on behalf of a customer of the service provider network 102. For example, the service provider network 102 can implement one or more of the services 104 to provide a website on behalf of a customer, where the website is accessed by a number of end users.

The service provider network 102 can include one or more data stores, such as data store 110. Data store 110 can provide logical storage units, such as representative logical storage unit 112, that are accessible to the computing devices 106, to VM instances provided by an on-demand computing service (not shown in FIG. 1) executing in the service provider network 102, and to other computing devices. In order to provide this functionality, the data store 110 can include software and computing resources that collectively operate to store objects, such as object 114, using block or file-level storage devices (and/or virtualizations thereof). The data stores 110 of the service provider network 102 can be a part of a cloud-based storage system and enable remote access to data and/or other functionality by the computing devices 106.

In various implementations, one or more of the objects 114 stored by the data store 110 can include a function, such as a function 116. The function 116 can include code that is executable to perform one or more calculations or computations that produce a result that can be utilized by a computing device 106 or an application executing on a computing device 106. Further, the function 116 can be associated with a version 118. The version 118 can indicate a series of changes to the code of the function 116 over time. In certain implementations, the version 118 can be determined by the data store 110 and updated as changes are made to the code of the function 116. In additional implementations, metadata indicating the version 118 can be obtained from a customer that is providing the function 116. In some configurations, the function 116 can be executed in response to the requests 120A, 120B, 120C.

In the illustrative example of FIG. 1, the logical storage units 112 provided by the storage service 100 can, for example, be accessed by the computing devices 106. In the example shown in FIG. 1, for instance, the requests 120A, 120B, 120C received from the computing devices 106 can be directed to the logical storage unit 112. The requests 120 can be read requests, write requests, copy requests, transform requests, copy requests, delete requests, update requests, transfer requests, range get requests, or other types of requests for interacting with all or a portion of the objects 114 and/or functions 116 stored on the logical storage unit 112.

The data store 110 allows objects 114 and/or functions 116 to be stored and accessed at a location identified by a prefix, which defines a location at which the objects 114 and/or functions 116 can be stored and accessed through a network-based storage service. A prefix can identify a storage container or another type of logical storage unit 112 provided by the data store 110, and a location within a nested folder structure where objects 114 and/or functions 116 can be stored (e.g. "container_name:/foo/bar/"). Stored objects 114 and/or functions 116 can be accessed (e.g. read from, written to, or deleted) using the prefix and the name of the object 114 and/or function 116 (e.g. "container_name:/foo/bar/object1.png"). Terms other than prefix, such as "path", might also be utilized to refer to the location at which objects 114 and/or functions 116 can be stored by a network-based storage service, such as the data store 110.

In various implementations, the object 114 and/or the function 116 can be stored in association with one or more tags. The tags can be metadata that provides information about the object 114 and/or the function 116. In some cases, a tag can indicate that a computing resource, such as the object 114 and/or the function 116, can be implemented with respect to providing one or more of the services to end-users. In particular implementations, a computing resource can be associated with a number of versions and a tag can indicate that rollback can take place with respect to an updated version of the computing resource.

In an illustrative example, a tag can indicate that the object 114 and/or the function 116 is utilized in a production environment for a customer of the service provider network 102. The production environment can be an environment that is accessible to end-user devices related to customers of the service provider network 102. A production environment can be different from a development environment because the development environment may be accessible to the customer itself, while the production environment is accessible to end-users accessing one or more of the services 104 on behalf of the customer. In an illustrative example, a website of a customer that is implemented by the service provider network 102 that is part of a development environment may be under construction and/or undergoing testing, while a website of a customer that is part of a production environment can be accessible to end-users of the customer.

The service provider network 102 can also include a monitoring system 122. The monitoring system 122 can monitor the requests 120 that are received from the computing devices 106. In particular, the monitoring system 122 can determine if errors are returned with respect to the requests 120. The errors can be related to an inability to access objects 114 and/or functions 116 that are being requested. For example, a request 120 can be attempting to access an object 114 for which access is not authorized for the computing device 106 making the request 120. In another example, a request 120 can include an incorrect address for an object 114 that the request 120 is attempting to access. Additionally, the errors can be related to indeterminate execution of the functions 116. That is, execution of a function 116 may return a result that is inconsistent with a request 120 or that is not formatted in accordance with a format specified in the request 120. The monitoring system 122 can also determine that an object 114, function 116, a configuration, or other aspect of a computing resource is associated with a tag. In these situations, the monitoring system 122 can determine a number of errors associated with the requests 120 related to computing resources associated with various tags. In an illustrative example, the monitoring system 122 can monitor requests 120 related to computing resources that are associated with a tag that can indicate auto-rollback functionality when an update occurs with respect to an aspect of the computing resources.

The service provider network 102 can also include an auto-rollback system 124. The auto-rollback system 124 can determine when to rollback a configuration of a computing resource based at least partly on information obtained from the monitoring system 122. For example, the auto-rollback system 124 can, at 126, detect an update to a computing resource. The update to the computing resource can include an update to a configuration of the computing resource. In situations where the computing resource includes a function 116, the code of the function can be updated to a different version. In particular implementations, the auto-rollback system 124 can obtain information from the monitoring system 122 with regard to computing resources that are associated with a particular tag, such as an auto-rollback tag that indicates rollback of the configuration of the computing resource can take place under certain conditions.

After detecting that a computing resource has been updated, the auto-rollback system 124, at 128, can monitor the requests 120 corresponding to the computing resource that has been updated during a rollback window. The rollback window can indicate a period of time after the update to the configuration of the computing resource where a rollback of the configuration can take place. In these situations, the rollback window can include a number of seconds, a number of minutes, or a number of hours. In other situations, the rollback window can indicate a number of requests related to the computing resource that are received after the update to the configuration of the computing resource, such as 500 requests, 1000 requests, 5000 requests, or 10,000 requests.

Further, the auto-rollback system 124 can, at 130, determine that a rollback condition has occurred. In some cases, the rollback condition can indicate a number of errors that are identified by the monitoring system 122 with respect to requests 120 associated with the configuration of the computing resource that has been updated. In order for the configuration of the computing resource to be rolled back, the rollback condition is satisfied during the rollback window. In situations where the rollback condition is not satisfied during the rollback window, the auto-rollback feature can be disabled. After determining that the rollback configuration is satisfied, the auto-rollback system 124 can modify the configuration of the computing resource to revert to a previous configuration.

Figure 2:
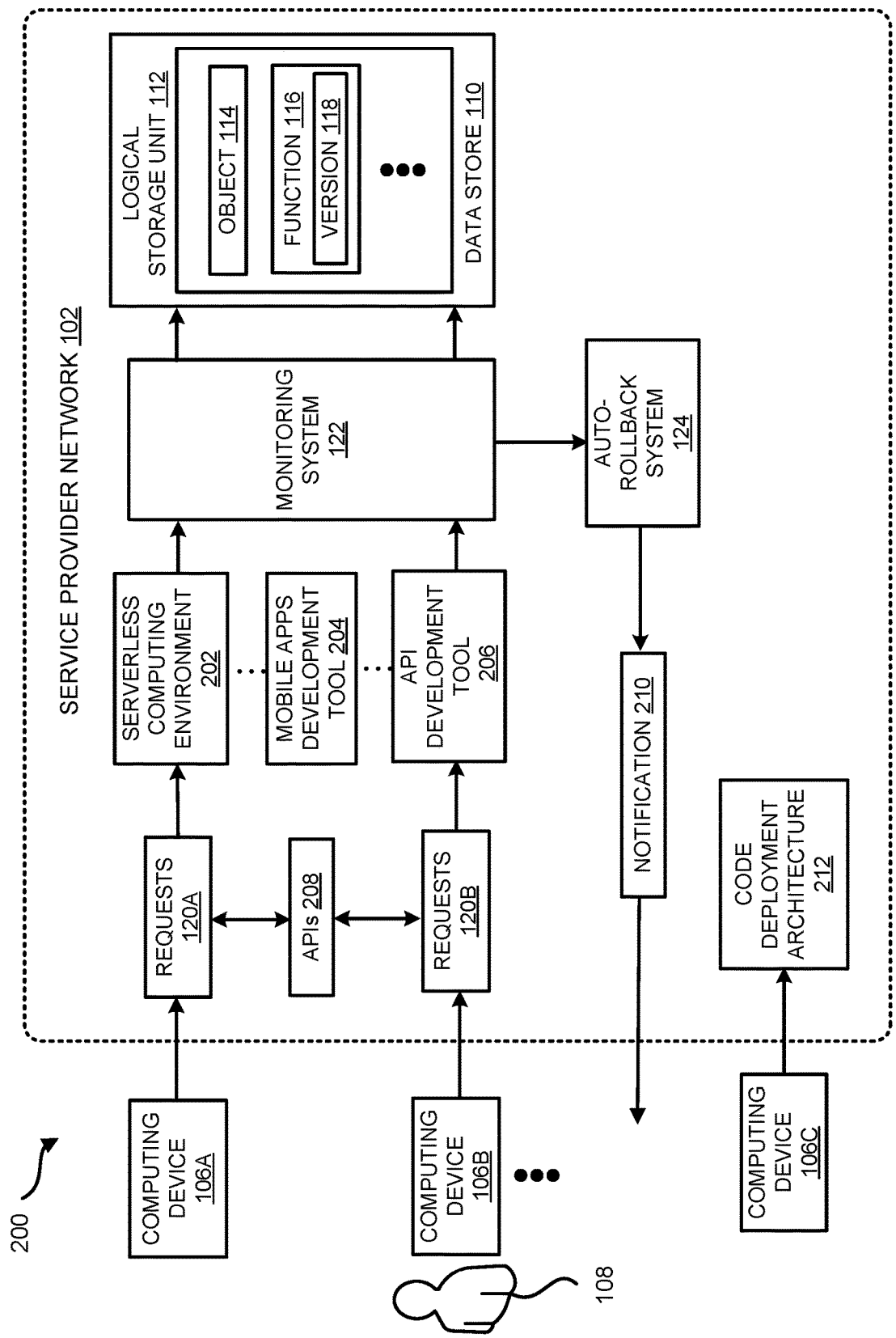
FIG. 2 is a software and network architecture diagram showing aspects of the operation of an auto-rollback system to stop using an updated version of a function or API and rollback to using a previous version of the function or API, according to one particular configuration.

FIG. 2 is a software and network architecture diagram showing aspects of the operation of a system 200 to stop using an updated version of a function or API and rollback to a previous version of the function or API, according to one particular configuration. The system 200 includes the service provider network 102 described previously with respect to FIG. 1.

The service provider network 102, can be accessed using an appropriate computing system, such as the computing devices 106A, 106B, and 106C, to communicate with the service provider network 102 over an appropriate data communications network (not shown in FIG. 1). In this way, the user 108 of the service provider network 102 can configure various aspects of the operation of the computing resources provided by the service provider network 102, or to otherwise control any computing resources being utilized by the user 108.

For example, and without limitation, a computing system 106 utilized by the user 108 of the service provider network 102 can be utilized to purchase computing resources in the service provider network 102, to configure aspects of the operation of the computing resources, to access and utilize functionality provided by the various services, tools, environments, and systems described herein, and/or to perform other types of functionality with regard to the operation of the computing resources provided by the service provider network 102.

The computing devices utilized to configure and monitor the resources in the service provider network 102 (e.g. the computing devices 106A, 106B, 106C) can be any type of computing device capable of connecting to the service provider network 102 via a suitable data communications network such as, but not limited to, a laptop or desktop computer, a tablet computing device, a server computer, or a smartphone.

Administrative users employed by the owner or operator of the service provider network 102, such as administrators managing the operation of the service provider network 102, can also connect with, manage, and utilize resources provided by network services executing within the service provider network 102 in a similar fashion. Additional details regarding the configuration and operation of the service provider network 102 will be provided below with regard to FIGS. 12-15.

As discussed briefly above, the service provider network 102 can be configured to execute various types of network services such as the services 104 of FIG. 1. For example, and without limitation, the service provider network 102 can implement a serverless computing environment 202. The serverless computing environment 202 can provide services directed to the execution of code provided by a customer of the service provider network 102. The serverless computing environment 202 can allocate computing resources and memory resources to the execution of code provided by a customer in response to certain triggers or events. In the absence of the triggers or events, the serverless computing environment 202 refrains from allocating computing resources and memory resources, such as VM instances. Thus, customers of the service provider network 102 do not need to pay for, manage, and/or otherwise allocate a particular amount of computing resources and memory resources before the triggers or events. Rather, the computing resources and memory resources to be utilized in the execution of the code of the customer are identified and allocated to the customer responsive to the triggers or events specified by the customer. In an illustrative example, the serverless computing environment 202 can execute one or more functions for a customer related to the sizing of images for desktop and mobile devices. Continuing with this example, the serverless computing environment 202 refrains from allocating computing resources and memory resources to the sizing of images until an actual image associated with the customer is provided to the serverless computing environment 202.

The service provider network 102 can also include a mobile application development tool 204. The mobile application development tool 204 can provide online resources for the creation of mobile applications. For example, the mobile application development tool 204 can provide online resources to build, test, and monitor mobile applications. To illustrate, the mobile application development tool 204 can enable users to integrate functionality, such as authentication, data storage, backend logic, push notifications, content delivery, and analytics, into the creation of a mobile application.

Additionally, the service provider network 102 can include an API development tool 206. The API development tool 206 provides online resources to publish, maintain, and test APIs that enable access to data, logic, and/or functionality related to back-end services utilized by customers of the service provider network 102. In various configurations, the API development tool 206 can provide services related to API call management, authorization and access control of the back-end services, and error monitoring. Other network services can provide different types of computing resources and/or functionality. In this regard, it should be appreciated that the network services and the respective computing resources that each provides are merely illustrative and that other types of network services can provide other types of computing resources and functionality in other configurations.

In some cases, the serverless computing environment 202, the mobile application development tool 204, and/or the API development tool 206 can work in conjunction with one another. For example, a customer of the service provider network 102 utilizing the mobile application development tool 204 to create a mobile application can also utilize the serverless computing environment 202 to execute code of one or more functions that are responsive to requests from the mobile application. Additionally, the customer can utilize the API development tool 206 to create an API that includes calls that can be utilized by the mobile application to access data and/or execute functions associated with the mobile application.

In the illustrative example of FIG. 2, the serverless computing environment 202 can obtain requests 120A from a computing device 106A and the requests 120A can correspond to the execution of code for one or more functions produced using the serverless computing environment 202. Additionally, the API development tool 206 can obtain requests 120B from a computing device, such as the computing device 106B. The requests 120B can include API calls to access functionality or data stored by the service provider network 102. In some configurations, the requests 120A and 120B can include calls of APIs 208. The APIs 208 can be produced by the API development tool 206, in some cases, while in other instances, customers of the service provider network 102 can directly provide one or more of the APIs 208 to the service provider network 102.

In various implementations, the serverless computing environment 202 can execute the function 116 that is the subject of a request 120 and return a result or an error that is tracked by the monitoring system 122. Additionally, the API development tool 206 can return errors to the monitoring system 122 for requests 120 that do not properly correspond to the particular API 208 that is related to the request 120. Although, the monitoring system 122 is shown as being logically separate from the serverless computing environment 202 and the API development tool 206, in some implementations, one or more of the serverless computing environment 202 or the API development tool 206 can perform the operations of the monitoring system 122.

The service provider network 102 can also include an auto-rollback system 124. The auto-rollback system 124 can cause the use of an updated version of a function 116 or an updated version of an API 208 to be discontinued in favor of a previous version of the function 116 or a previous version of the API 208. The auto-rollback system 124 can modify a version of a function 116 or an API 208 being utilized based on determining that a rollback condition has been satisfied. In some examples, a rollback condition can correspond to an error rate for requests 120 attempting to utilize a particular version of a function 116 or a particular version of an API 208. To illustrate, the error rate can indicate a number of errors generated by requests corresponding to a particular function 116 or a particular version of an API 208 over a period of time, such as 5 errors per 1000 requests. In other instances, the rollback condition can be related to an absolute number of errors for a version of a function 116 or a version of an API 208, such as 500 errors total. In particular examples, the rollback condition can indicate a failure rate of status code responses divided by a total number of responses to the requests 118 within a particular period of time or within a specified number of requests. In various implementations, if the rollback condition is not satisfied within the rollback window, the update can be considered stable and the auto-rollback functionality can be disabled.

The rollback condition can be determined, in some cases, based on input received from a user. In particular examples, a user interface can include user interface elements that can capture information related to a rollback condition. In various configurations, the user interface can provide a number of predetermined, selectable options indicating a specified rollback condition. In other implementations, the user interface can include a user interface element that can capture a rollback condition entered by a user. Additionally, the rollback condition can be based at least partly on error rates of previous versions of the function 116 or the API 208. For example, an error rate of an updated version of a function 116 or an API 208 can correspond to or be similar to an error rate of a previous version of the function 116 or the API 208. Further, machine learning can be utilized to determine a rollback condition for a function 116 or an API 208. In an illustrative example, error rates for a number of functions 116 or error rates for a number of APIs 208 can be analyzed to determine an error rate to be included in a rollback condition for a particular function 116 or API 208.

The auto-rollback system 124 can analyze data obtained from the monitoring system 122 to determine whether a rollback condition has been satisfied. The auto-rollback system 124 can determine that an updated version of a function 116 or an updated version of an API 208 has been implemented. In some cases, the auto-rollback system 124 can obtain information from the serverless computing environment 202, the API development tool 206, and/or the monitoring system 128 indicating that a version of a function 116 or a version of an API 208 has been updated. After determining that a function 116 or an API 208 has been updated, the auto-rollback system 124 can track a number of the requests 120 that correspond to a particular function 116 or a particular API 208 that has been updated. In addition, the auto-rollback system 124 can identify a number of the requests 120 corresponding to the updated version of the function 116 or the API 208 that resulted in errors. Based on the number of requests 120 corresponding to an updated version of the function 116 or the API 208 that resulted in an error, the auto-rollback system 124 can determine whether a rollback condition has been satisfied.

In situations that the auto-rollback system 124 determines that a rollback condition has been satisfied, the auto-rollback system 124 can provide a notification 210 to one or more of the computing devices 106 or to other computing devices, such as a computing device of an administrator of the service provider network 102 or an administrator of a customer of the service provider network 102. The notification 210 can indicate that an updated version of a function 116 or an API 208 has been rolled back to a previous version of the function 116 or API 208. In some cases, the notification 210 can be provided via an email or text message. In other cases, the notification 210 can be provided via an online control panel or dashboard that is accessible to the customer with a function 116 or API 208 that experienced a rollback condition. In these cases, an alert can be published via the online control panel or dashboard.

Although not shown in the illustrative example of FIG. 2, the auto-rollback system 124 can provide a notification 210 to the serverless computing environment 202 and/or the API development tool 206 that a function 116 and/or an API 208 has been the subject of a rollback condition. Accordingly, the serverless computing environment 202 can execute a previous version of the function 116 in response to requests 120A to execute the function 116 that were received subsequent to the rollback condition being satisfied for the function 116. Additionally, the API development tool 206 can notify computing devices 106 utilizing the updated version of the API 208 to change to a previous version of the API 208 based on the rollback condition being satisfied.

Further, the service provider network 102 includes a code deployment architecture 212. The code deployment architecture 212 can provide resources to develop and test code. In particular, the code deployment architecture 212 can be used to deploy code of a customer of the service provider network 102 to virtual machine instances provided by the service provider network 102, to private virtual machine instances of the customer, and/or to physical computing devices of the customer. Typically, the use of the code deployment architecture 212 to update or modify versions of a function 116 can utilize an increased number of computing resources and memory resources than the execution of functions 116 using the serverless computing environment 202. For example, the serverless computing environment 202 does not allocate resources to execute a version of a function 116 until a trigger or event is detected that indicates that the function 116 is to be executed. On the other hand, the code deployment architecture 212 utilizes existing resources dedicated to a customer to execute a version of a function 116. Thus, by utilizing the serverless computing environment 202 to update and rollback versions of functions 116, the configurations and techniques described herein are different from conventional techniques related to the use of the code deployment architecture 212 and utilize fewer computing resources and memory resources than the code deployment architecture 212. Additional details regarding the mechanism described above with regard to FIG. 2 for the rollback of updated versions of functions 116 and/or APIs 208 will be provided below with regard to FIGS. 3-15.

Figure 3:
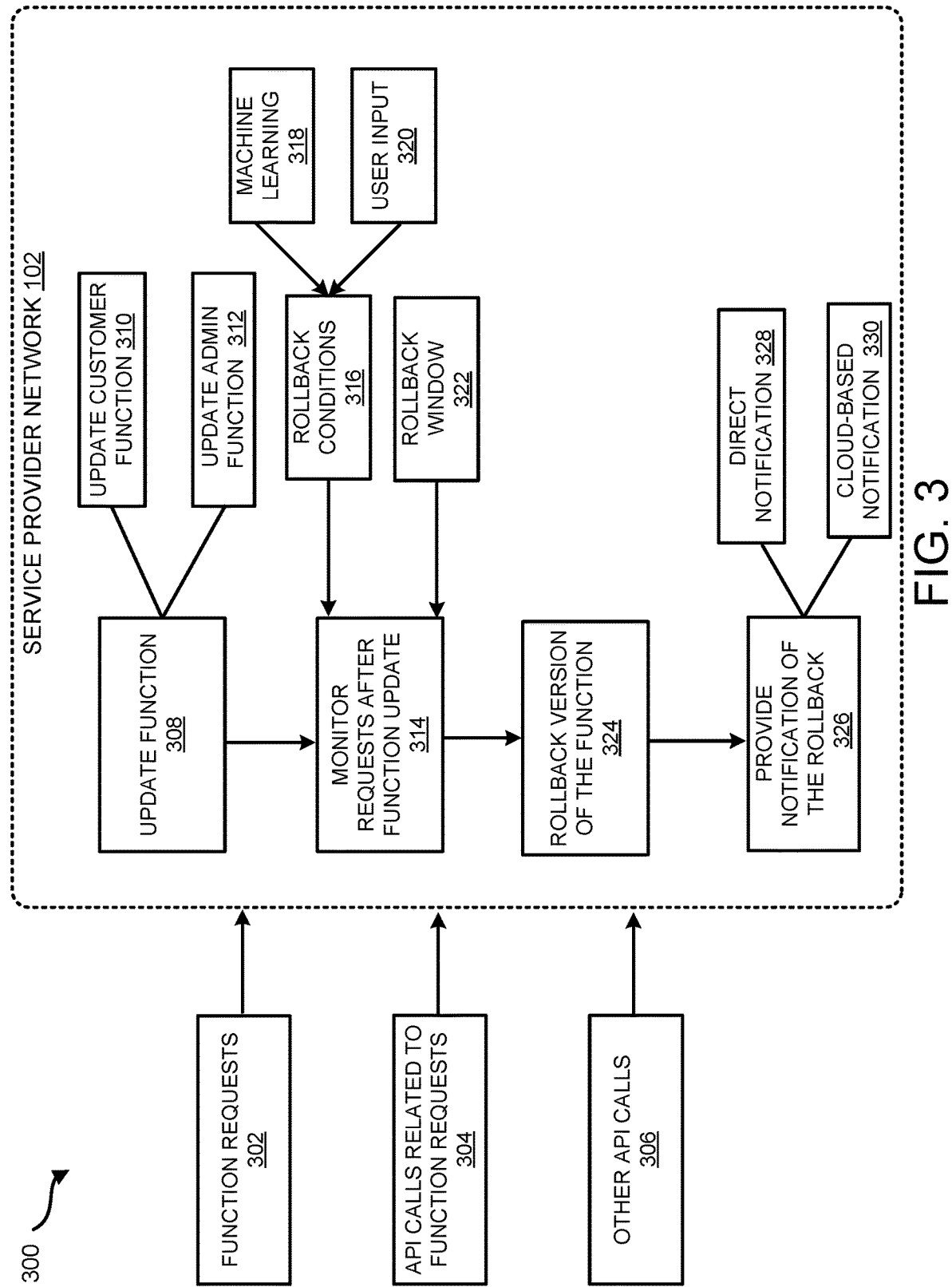
FIG. 3 is an additional architecture of a service provide network that processes requests according to a previous version of an API or a previous version of a function when rollback conditions are satisfied, according to one particular configuration.

FIG. 3 is an additional architecture 300 of a service provider network 102 that process requests according to a previous version of an API or a previous version of a function when rollback conditions are satisfied, according to one particular configuration. In the illustrative implementation of FIG. 3, the service provider network 102 can receive a number of requests to be processed by the service provider network 102. In particular, the service provider network 102 can receive function requests 302. The function requests 302 correspond to requests to execute a function stored by the service provider network 102, such as the function 116 of FIG. 1 and FIG. 2. In response to receiving a function request 302, the service provider network 102 can access code corresponding to the function from a data store and execute the function in accordance with the function request 302. Execution of the function request 302 can cause one or more computations or calculations to be performed and cause a result to be produced. In some cases, the result of execution of the function can be provided to a computing device that sent the function request 302. In other situations, the result of execution of the function can be provided to another computing device.

The service provider network 102 can also receive API calls related to function requests 304. In response to receiving an API call related to a function request 304, the service provider network 102 can access code corresponding to the function from a data store and execute the function in accordance with the API call. Similar to the operations performed in response to a function request 302, the service provider network 102 can produce a result of executing the function and provide the result to one or more computing devices. The service provider network 102 can also receive other API calls 306. In these situations, the other API calls 306 may not be related to the execution of a function stored by the service provider network 102. In some cases, errors associated with the other API calls 306 can be utilized to determine a rollback condition for an API.

The service provider network 102 can perform an operation 308 including updating a function. A function can be updated by changing the code of the function. In some implementations, at operation 308, a function of a customer of the service provider network 102 can be updated. For example, a function of the customer can be updated by obtaining an updated version of the code of the function from the customer. In these situations, the service provider network 102 can provide a user interface that includes one or more user interface elements to capture the updated version of the code for the function.

In various implementations, when the function of the customer is updated, a number of options can be provided for rollback of the function to a previous version. For example, the service provider network 102 can provide a user interface that includes a number of selectable options indicating a plurality of rollback conditions. The plurality of rollback conditions can correspond to different error rates corresponding to requests to execute the updated version of the function. The user interface can also include an option to forego auto-rollback of a function or an option to enable auto-rollback of the function. In additional implementations, the service provider network 102 can provide a user interface including a user interface element to capture one or more rollback conditions manually entered by the customer, such as an error rate for requests to execute the updated version of the function.

Additionally, the service provider network 102 can perform operation 312 to update a function of an administrator of the service provider network 102. In some configurations, the function of the administrator can be stored in conjunction with an account of a customer of the service provider network 102. In these implementations, the function can be executed to perform operations related to a service provided by the service provider network 102 to the customer. In an illustrative example, the administrator of the service provider network 102 can provide a function to an account of a customer that performs operations related to a mobile application development tool, such as operations to deploy, test, or monitor a mobile application created by the mobile application development tool. In situations where the function of the administrator is stored in an account of a customer of the service provider network 102, the administrator can have permission to access the function and provide the updated version of the code of the function to the account of the customer. In other situations, a tool or resource of the account of the customer can obtain information from the administrator indicating that an updated version of the function is available and the tool or resource can then obtain the updated version of the function.

At operation 314, the service provider network 102 can monitor requests received that correspond to the function after the updated version of the function has been implemented. In particular, the service provider network 102 can analyze the function requests 302 and the API calls related to the function requests 304 that are requesting to execute the function. The service provider network 102 can then analyze information indicating the execution of the requests, such as information indicating errors that take place with respect to requests to execute the updated version of the function.

The service provider network 102 can analyze information corresponding to the requests to execute the function with respect to one or more rollback conditions 316. The one or more rollback conditions 316 indicate one or more criteria to be utilized to determine when to change from an updated version of a function to a previous version of the function. The rollback conditions 316 can indicate a rate of errors and/or a total number of errors caused when execution of the updated version of the function is requested. In some cases, the rollback conditions 316 can be determined based on machine learning 318. The machine learning 318 can analyze information gathered by the service provider network 102 indicating errors associated with previous rollbacks of functions. The functions that were previously rolled back can be related to the function being monitored with respect to operations performed by the previous functions, a type of the previous functions, data utilized by the previous functions, and so forth. In various implementations, the function being monitored can be classified and the machine learning 318 can include analyzing previous rollbacks having a similar classification as the function being monitored to determine a rollback condition for the function being monitored.

The rollback conditions 316 can also be determined based on user input 320. The user input 320 can indicate a rollback condition for a function being monitored, such as an error rate associated with request to execute the function being monitored. In some configurations, the user input 320 can be used in conjunction with the machine learning 318. That is, user input 320 indicating a previous rollback condition, a hypothetical rollback condition, and/or a current rollback condition can be analyzed in conjunction with a corpus of data corresponding to rollbacks of other functions to determine rollback conditions 316.

Additionally, the requests 302, 304 can be monitored during a rollback window 322. The rollback window 322 can indicate a period during which auto-rollback of a version of a function can take place. In some cases, the rollback window 322 can indicate a specified period of time. In other cases, the rollback window 322 can indicate a specified number of requests 302, 304 received by the service provider network 102 after the updating of the function. After the rollback window 322 expires, the functionality related to auto-rollback of a version of a function can be disabled.

At operation 324, the service provider network 102 can rollback the version of a function to a previous version of the function. In particular, based on determining that a rollback condition has been satisfied, the service provider network 102 can cause requests for execution of a function to utilize a previous version of the function instead of the updated version of the function. Rolling back the updated version of the function at 324 can include determining the version to replace the updated version. In some implementations, a protocol can be accessed that indicates the versions of a function to utilize when another version of the function is rolled back. For example, a protocol can indicate that when an updated version of a function is rolled back, a previous version of the function that is most recent in time with respect to the updated version is to be executed in response to subsequent requests for the function. In another example, a protocol can indicate a default version of the function to be executed with respect to requests received after rollback of the updated version of the function.

At operation 326, the service provider network 102 can provide a notification of the rollback. The notification of the rollback can be provided to the customer of the service provider network 102 that updated the function. In some cases, the notification can include a direct notification 328, such as an email or message to a computing device of the customer. Additionally, the notification can include a cloud-based notification 330 that is accessible via online resources. In particular, the cloud-based notification 330 can include an alert or alarm provided in conjunction with a dashboard or control panel provided by the service provider network 102 for the customer. The dashboard or the control panel can include one or more user interfaces that provide metrics and information related to services obtained by the customer via the service provider network 102.

Figure 4:
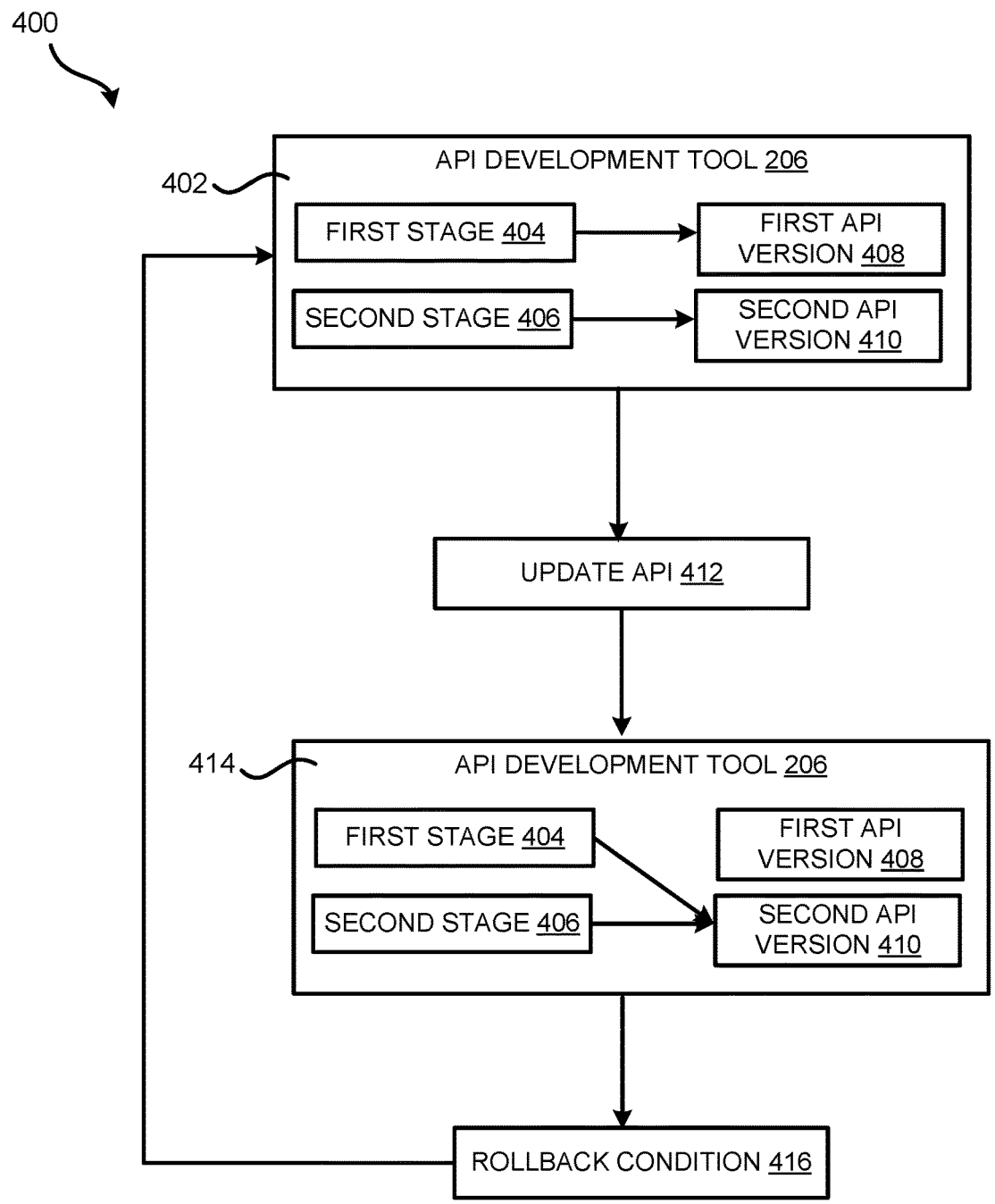
FIG. 4 is a diagram of an architecture that includes an API development tool that can rollback to a previous version of an API based on satisfying a rollback condition, according to one particular configuration.

FIG. 4 is a diagram of an architecture 400 that includes an API development tool 206 that can rollback to a previous version of an API based on satisfying a rollback condition, according to one particular configuration. The API development tool 206 can have a first arrangement 402 that includes a first stage 404 and a second stage 406. The first stage 404 can include a production stage by which the API development tool 206 publishes an API and monitors calls associated with the API. The second stage 406 can include a development stage in which a customer utilizing the API development tool 206 can create and test an API. In the illustrative example of FIG. 4, the first stage 404 initially utilizes a first API version 408 and the second stage 406 initially utilizes a second API version 410. The second API version 410 can be an updated or more recent version of the API that is being tested, but has not been published for use. The first API version 408 can include a previous version of the API that has been published and that provides calls received by a service provider network, such as the service provider network 102 of FIG. 1, FIG. 2, and FIG. 3.

At operation 412, the API is updated and a second arrangement 414 of the API development tool 206 is produced. The second arrangement 414 includes the first stage 404 and the second stage 406. In the illustrative example of FIG. 4, the second arrangement 414 indicates that both the first stage 404 and the second stage 406 utilize the second API version 410. Accordingly, the production stage has changed from utilizing the first API version 408 in the first arrangement 402 to utilizing the second API version 410.

At operation 416, a rollback condition is detected. The rollback condition can indicate a number of errors and/or an error rate associated with calls of the second API version 410 in the production stage. Based on detecting the rollback condition, the arrangement of the API development tool 206 is changed from the second arrangement 414 to the first arrangement 402, such that the first stage 404 points back to the first API version 408 instead of the second API version 410.

Figure 5:
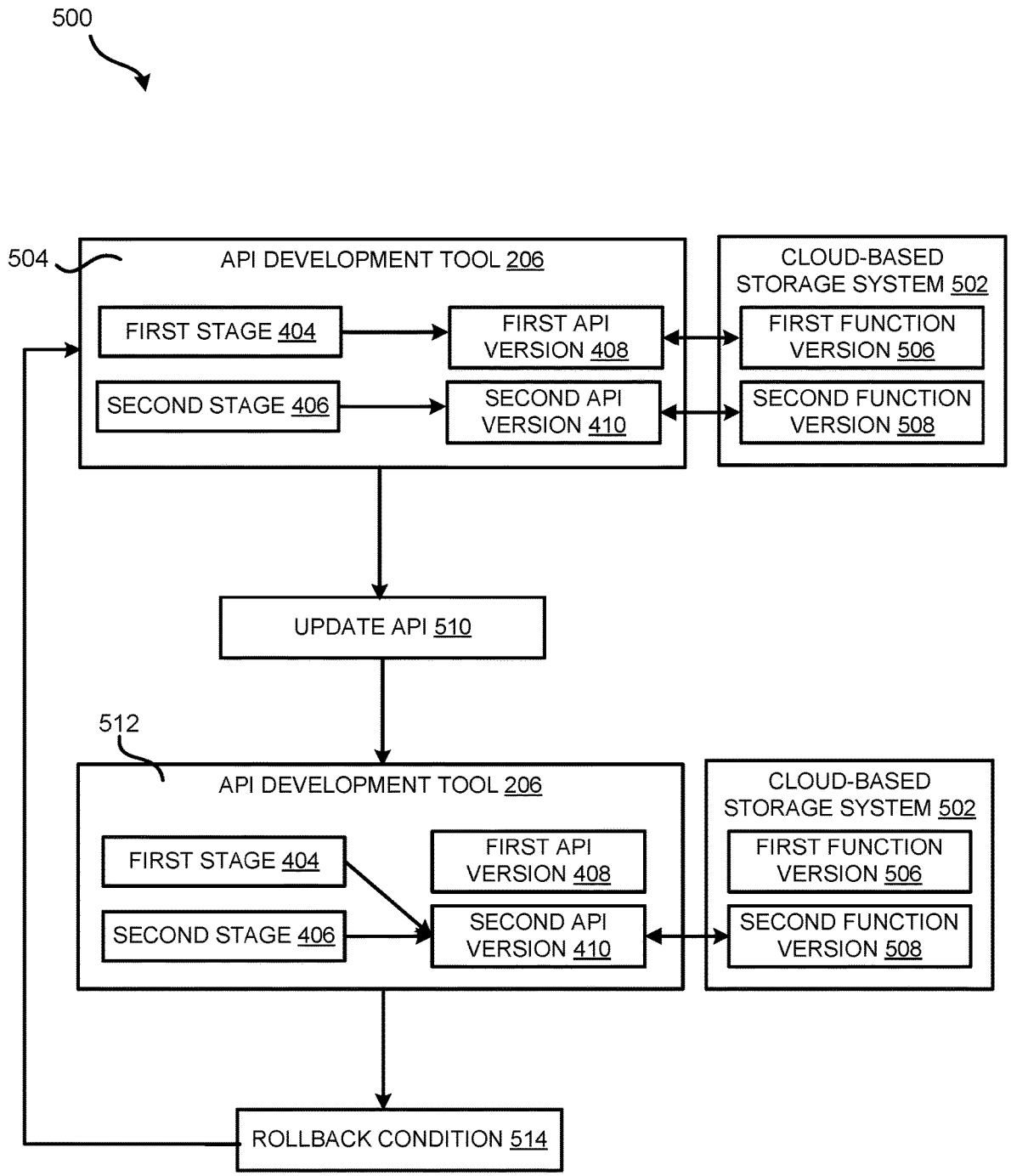
FIG. 5 is a diagram of an additional architecture that includes the API development tool that can rollback to a version of an API that calls a previous version of a function stored in a cloud-based storage system, according to one particular configuration.

FIG. 5 is a diagram of an additional architecture 500 that includes the API development tool 206 that can rollback to a version of an API that calls a previous version of a function stored in a cloud-based storage system 502, according to one particular configuration. The API development tool 206 can include a first arrangement 504 having the first stage 404 corresponding to a first API version 408 and the second stage 406 corresponding to the second API version 410 in a manner similar to that described previously with respect to FIG. 4. Additionally, the first API version 408 can include calls to a first function version 506 and the second API version 410 can include calls to a second function version 508. The second function version 508 can include a more recent version or an updated version of the code of a function than the first function version 506. Since the first stage 404 corresponds to the first API version 408, calls to execute the function will be configured in accordance with the first API version 408 and cause the first function version 406 to be executed.

At operation 510, the API is updated such that the API development tool 206 has a second arrangement 512. In the second arrangement 512, the first stage 404 and the second stage 406 correspond to the second API version 410 and the second API version 410 includes calls corresponding to the second function version 508. In these implementations, subsequent calls to execute the function will be configured in accordance with the second API version 410 and cause the second function version 508 to be executed.

At operation 514, a rollback condition is detected. The rollback condition can indicate a number of errors and/or an error rate associated with calls of the second API version 410 in the production stage that execute the second function version 508. The rollback condition of operation 514 is different from the rollback condition of the operation 416 of FIG. 4 in that the rollback condition of operation 514 is determined based on errors related to calls of the second API version 410 that specifically correspond to execution of a version of the function, which is the second function version 508 in this case. The rollback condition of operation 514 is instead related to errors of all of the calls of the second API version 410 and not just those related to execution of the second function version 508. Based on detecting the rollback condition, the arrangement of the API development tool 206 is changed from the second arrangement 512 to the first arrangement 502, such that the first stage 404 points back to the first API version 408 and utilizes calls of the first function version 506 instead of the first stage 404 pointing to the second API version 410 and utilizing the calls of the second function version 506 in the second arrangement 512.

Figure 6:
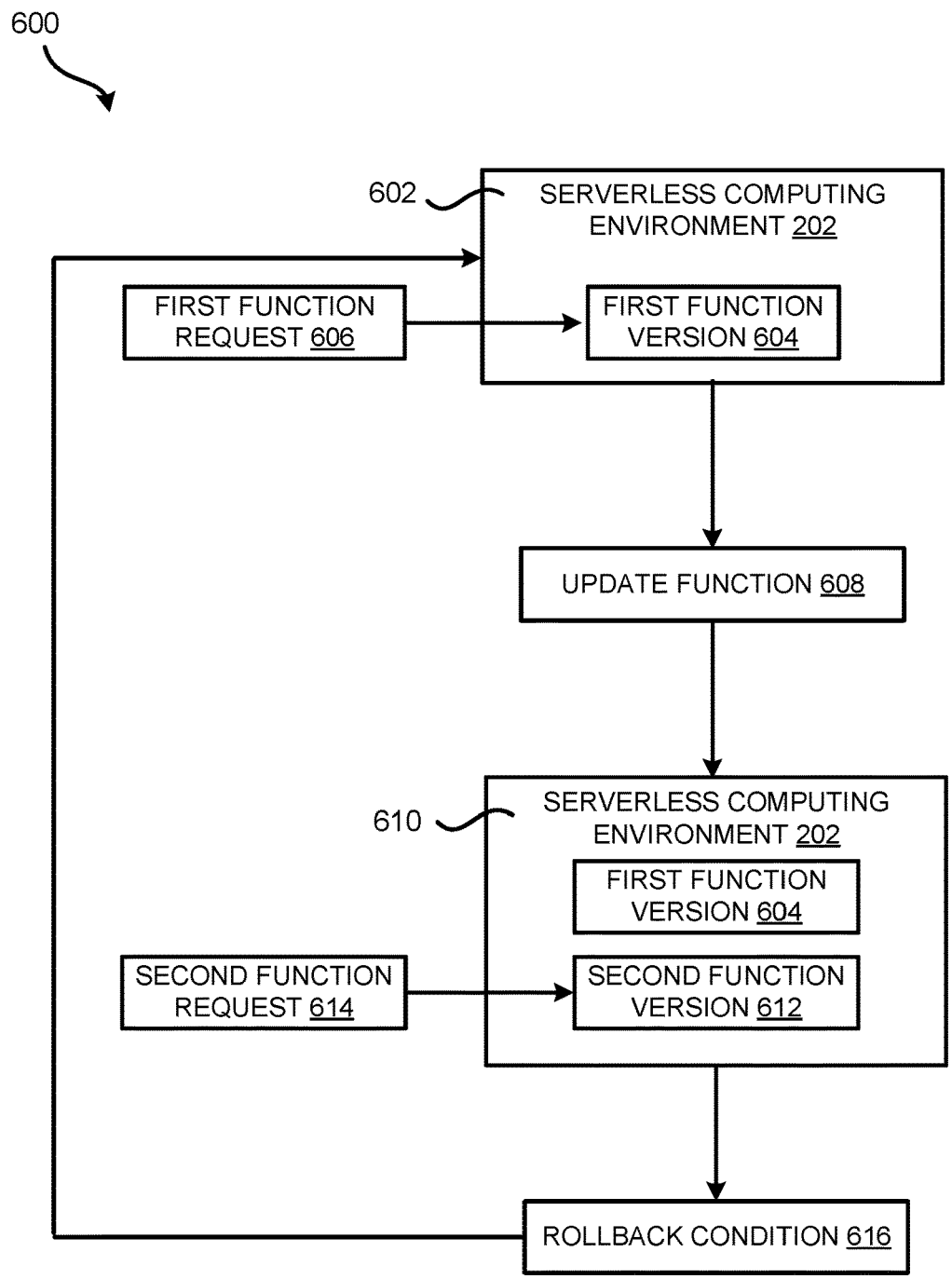
FIG. 6 is a diagram of an architecture that includes a serverless computing environment that can rollback to a previous version of a function based on satisfying a rollback condition, according to one particular configuration.

FIG. 6 is a diagram of an architecture 600 that includes a serverless computing environment 202 that can rollback to a previous version of a function based on satisfying a rollback condition, according to one particular configuration. The serverless computing environment 202 can have a first arrangement 602 that includes a first function version 604. In various configurations, the serverless computing environment 202 can store the first function version 604 as an object and directly access the code of the first function version 604. Additionally, the serverless computing environment 202 can receive a first function request 606 to execute the function. In response to receiving the first function request 606, the serverless computing environment 202 can access code of the first function version 604 stored by the serverless computing environment 202 and execute the code of the first function version 604.

At operation 608, the function can be updated and the serverless computing environment 202 can have a second arrangement 610. The second arrangement 610 can include the first function version 604 and a second function version 612. The second function version 612 can be an updated version of the first function version 604. In the second arrangement 610, the serverless computing environment 202 can include an object storing code of the first function version 604 and code of the second function version 612. Additionally, the serverless computing environment 202 can receive a second function request 614 to execute the function. In response to receiving the second function request 614, the serverless computing environment 202 can directly access code of the second function version 612 stored by the serverless computing environment 202 and execute the code of the second function version 612.

At 616, a rollback condition can be detected. The rollback condition can be detected based on a number of errors and/or an error rate with respect to executing the second function version 612. In response to determining the rollback condition, the serverless computing environment 202 can change back to the first arrangement 602 from the second arrangement 610. In some implementations, after detecting the rollback condition, the second function version 612 can remain stored by the serverless computing environment 202.

Figure 7:
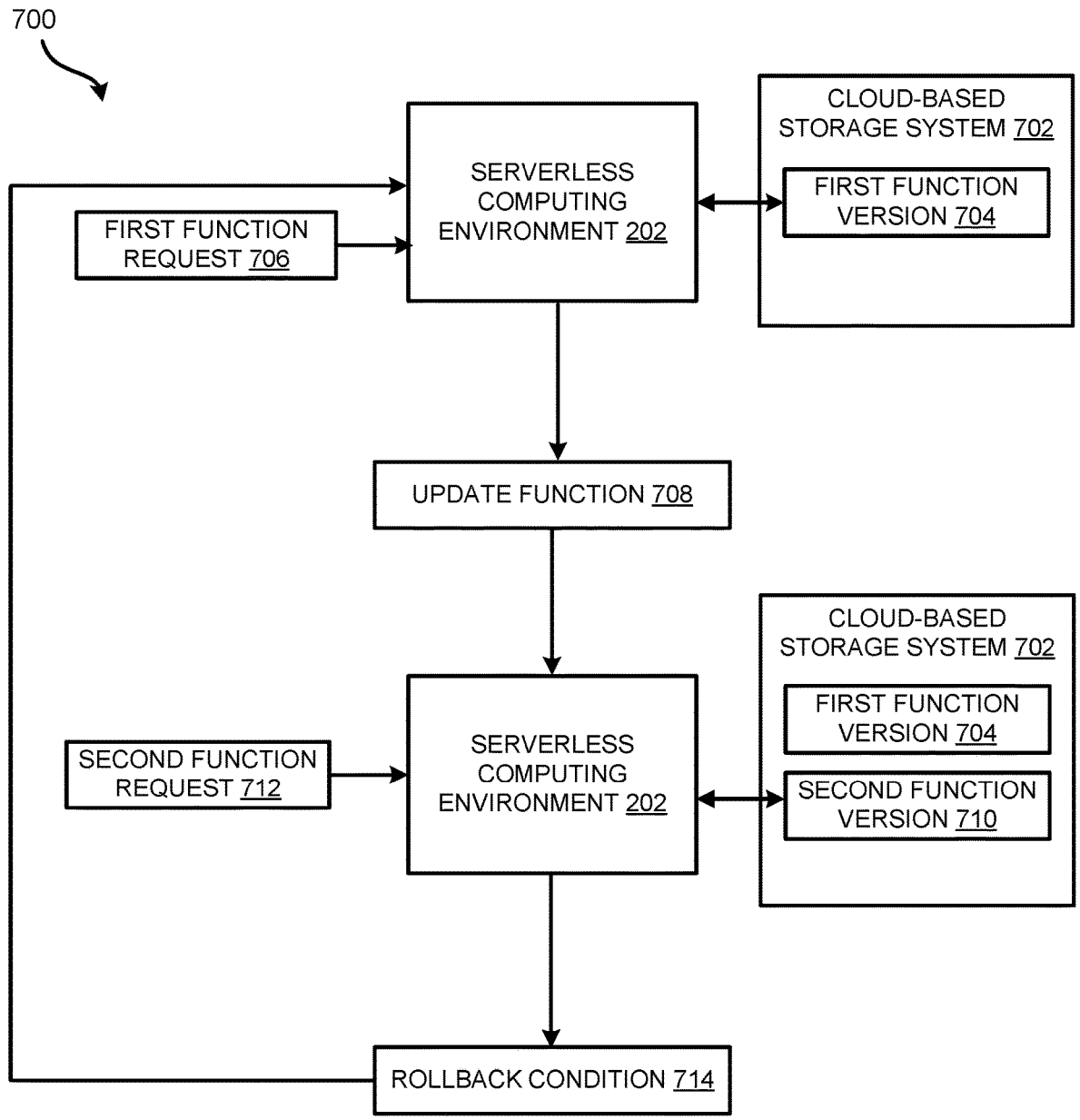
FIG. 7 is a diagram of an additional architecture that includes the serverless computing environment that can rollback to a previous version of a function stored in a cloud-based storage system based on satisfying a rollback condition, according to one particular configuration.

FIG. 7 is a diagram of an additional architecture 700 that includes the serverless computing environment 202 that can rollback to a previous version of a function stored in a cloud-based storage system 702 based on satisfying a rollback condition, according to one particular configuration. The serverless computing environment 202 can access data stored by the cloud-based storage system 702, such as a first function version 704. Additionally, the serverless computing environment 202 can receive a first function request 706 to execute the function. In response to receiving the first function request 706, the serverless computing environment 202 can retrieve code of the first function version 704 from the cloud-based storage system 702 and execute the code in conjunction with the first function request 706. In various implementations, the serverless computing environment 202 can store metadata indicating a storage location of the current version of the function and also additional metadata indicating storage locations of previous versions of the function. The serverless computing environment 202 can utilize the metadata indicating the storage location of the first function version 704 to retrieve the code of the first function version 704.

At operation 708, the function can be updated to a second function version 710. The second function version 710 can include code that is updated from the first function version 704. In some cases, the second function version 710 can be stored in an object of the cloud-based storage system 702 different from an object storing the first function version 704. In additional configurations, the second function version and the first function version 704 can be stored in the same object of the cloud-based storage system 702. In these situations, the data object can track different versions of code stored with respect to the function.

After updating the function, the serverless computing environment 202 can receive a second function request 712. In response to receiving the second function request 712, the serverless computing environment 202 can retrieve code of the second function version 710. In some cases, the serverless computing environment 202 can utilize metadata indicating the storage location of the second function version 710 to retrieve the code of the second function version 710.

At 714, a rollback condition can be detected. The rollback condition can be detected based on a number of errors and/or an error rate with respect to executing the second function version 710. In response to determining the rollback condition, the serverless computing environment 202 can revert to accessing the first function version 704 in response to subsequent requests to execute the function. In some implementations, after detecting the rollback condition, the second function version 710 can remain stored by the cloud-based storage system 702.

Figure 8:
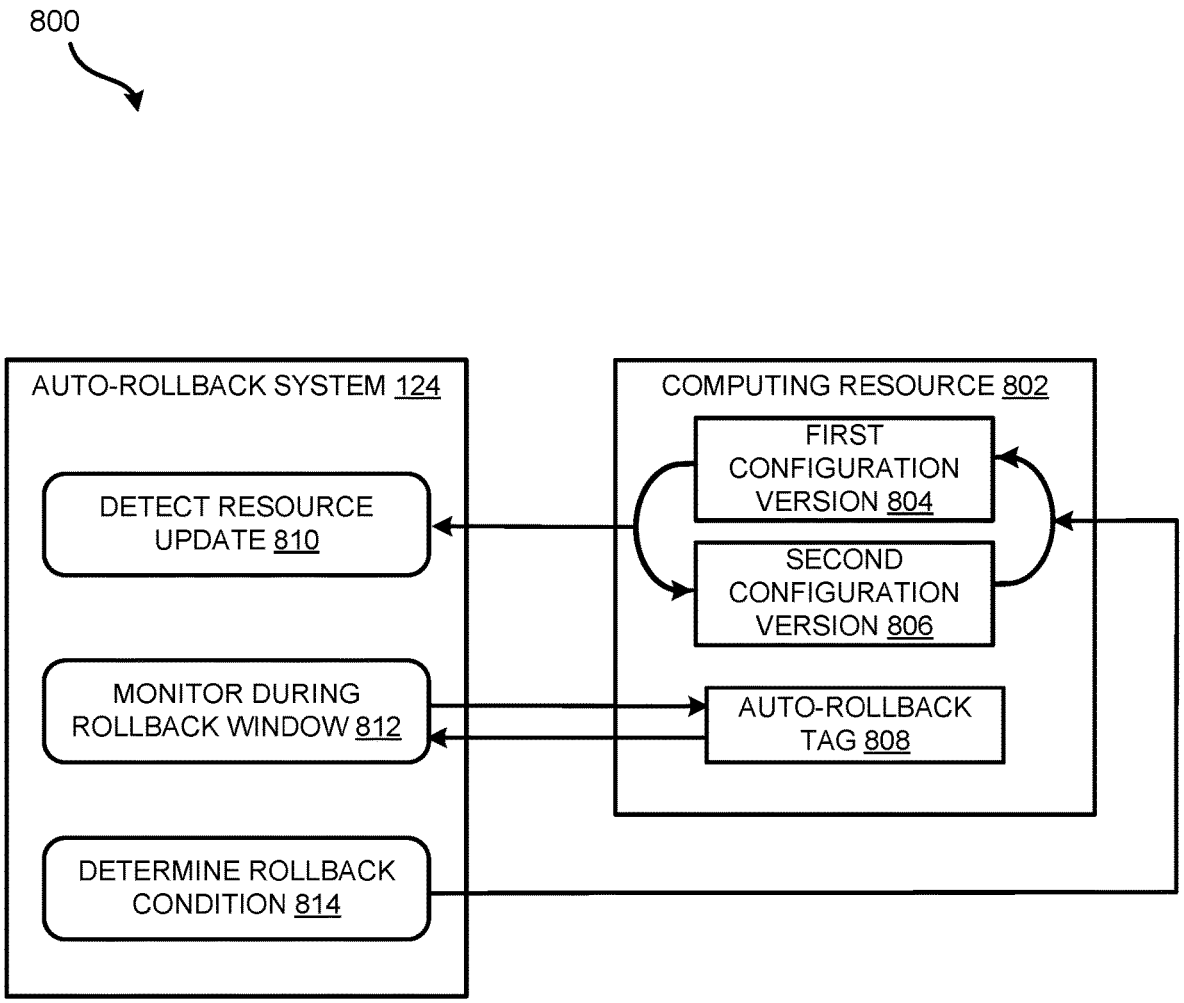
FIG. 8 is a diagram of an architecture of an auto-rollback system to modify a configuration of a tagged computing resource in response to detecting a rollback condition during a rollback window, according to one particular configuration.

FIG. 8 is a diagram of an architecture 800 of an auto-rollback system 124 to modify a configuration of a tagged computing resource in response to detecting a rollback condition during a rollback window, according to one particular configuration. The architecture 800 includes a computing resource 802. The computing resource 802 can include a memory resource or a processing resource. In some cases, the computing resource 802 can be associated with a function. In the illustrative example of FIG. 8, the computing resource 802 can include a first configuration 804 and a second configuration 806. Additionally, the computing resource 802 can include an auto-rollback tag 808. The auto-rollback tag 808 can indicate that a configuration of the computing resource 802 can be rolled back to a previous version under certain conditions.

At 810, the auto-rollback system 124 can detect that the configuration of the computing resource 802 has been updated. For example, the auto-rollback system 124 can detect that the configuration of the computing resource 802 can be updated from the first configuration version 804 to a second configuration version 806. In addition, at 812, the auto-rollback system 124 can monitor the computing resource 802 during a rollback window. In particular implementations, the auto-rollback system 124 can monitor the computing resource 802 during the rollback window based on determining that the computing resource 802 is associated with the auto-rollback tag 808. In these situations, the auto-rollback system 124 can monitor the computing resource 802 for a specified period of time after changing to the second configuration version 806 or for a specified number of requests after changing to the second configuration version 806. The auto-rollback system 124 can monitor requests to utilize the computing resource 802 after changing to the second configuration version 806 and identify a number of errors associated with the requests.

At 814, the auto-rollback system 124 can determine that a rollback condition occurs within the rollback window. In some cases, the rollback condition can correspond to a number of requests to utilize the computing resource 802 that resulted in an error. In these scenarios, the auto-rollback system 124 can cause the configuration of the computing resource 802 to be modified from the second configuration version 806 to the first configuration version 804.

Figure 9:
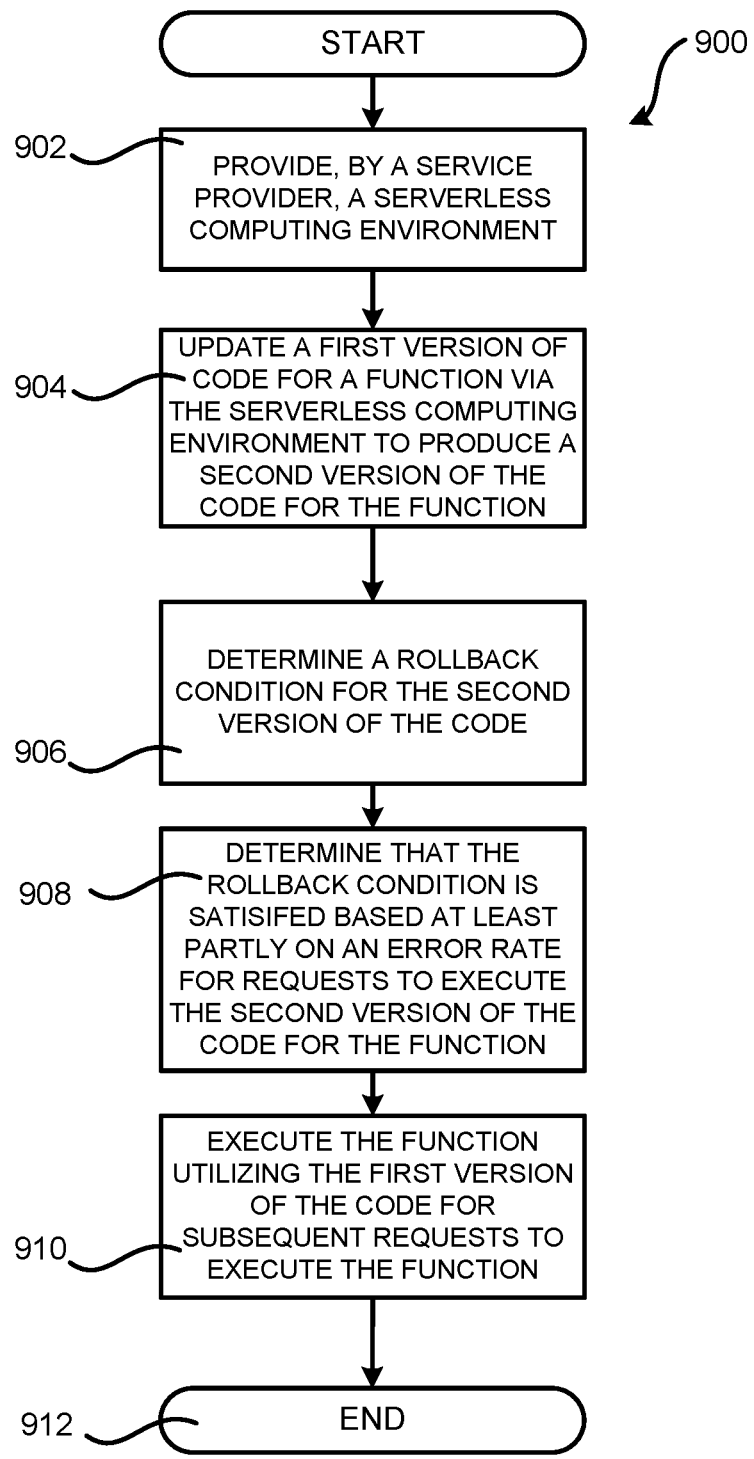
FIG. 9 is a flow diagram showing aspects of a process to rollback a version of code for a function based on rollback conditions being satisfied, according to one particular configuration.
Figure 10:
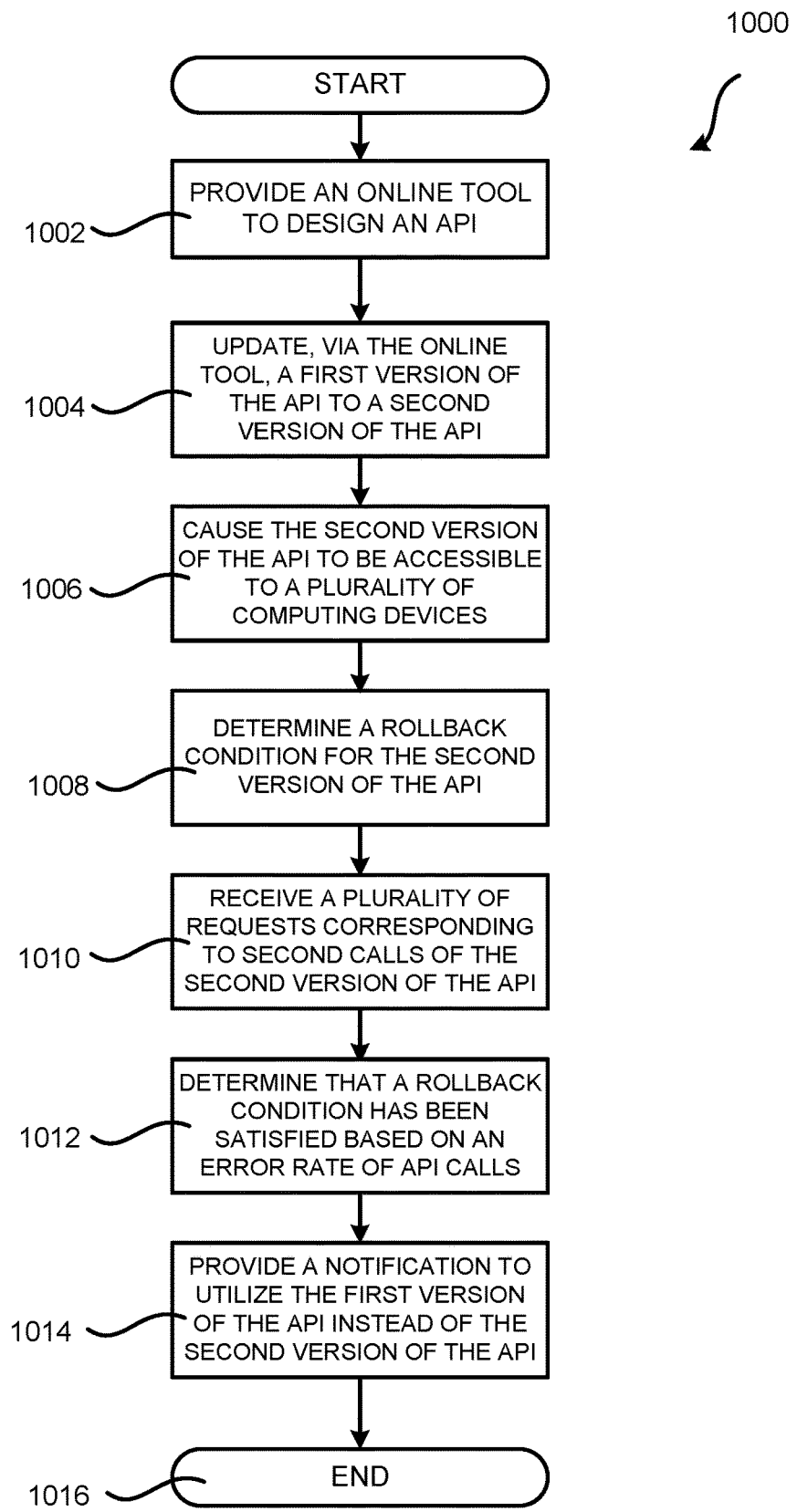
FIG. 10 is a flow diagram showing aspects of a process to rollback a version of an API to a previous version based on rollback conditions being satisfied, according to one particular configuration.
Figure 11:
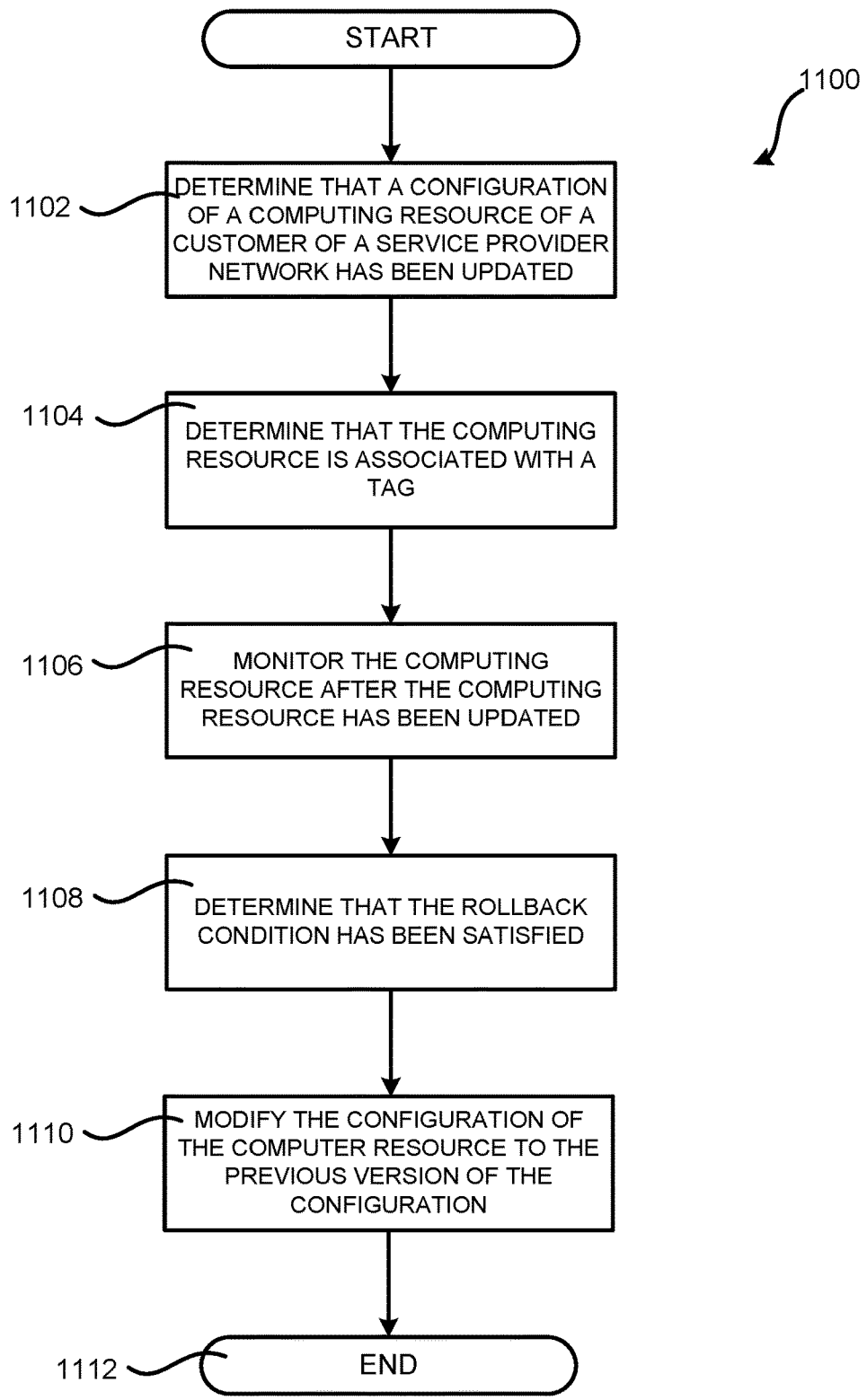
FIG. 11 is a flow diagram showing aspects of a process to rollback a configuration of a computing resource that has been updated based on a rollback condition being satisfied, according to one particular configuration.

It should be appreciated that the logical operations described herein with respect to FIGS. 9, 10, and 11, and the other FIGS., can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules.

These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 9 is a flow diagram showing aspects of a process 900 to rollback a version of code for a function based on rollback conditions being satisfied, according to one particular configuration. The process 900 shown in FIG. 9 begins at operation 902, where a service provider provides a serverless computing environment. The serverless computing environment can refrain from allocating computing resources and memory resources for a customer until events or triggers are detected that cause the execution of code of the customer stored by the serverless computing environment.

At 904, the process 900 includes updating a first version of code for a function via the serverless computing environment to produce the second version of the code for the function. In various implementations, the function can be stored in association with an account of the customer of the serverless computing environment and the second version of the code can be obtained by the serverless computing environment via a user interface that includes user interface elements to capture the second version of the code. In additional implementations, the function can be stored in association with an account of a customer of the serverless computing environment and the second version of the code can be obtained from a computing device of an administrator of the service provider.

Further, in some configurations, the first version of the code can be stored by a first data object of a cloud-based storage service and the second version of the code can be stored by a second data object of the cloud-based storage service. In other configurations, the first version of the code and the second version of the code are stored by data objects maintained by the serverless computing environment. Also, the serverless computing environment can store information indicating a version of the code associated with the function that is to be utilized in response to requests to execute the function.

At 906, the process 900 can include determining a rollback condition for the second version of the code. The rollback condition can indicate a number of errors and/or an error rate for requests to execute the second version of the code. In particular implementations, the rollback condition can be determined by executing a machine learning algorithm to analyze information related to a number of additional rollback conditions. The rollback condition can also be determined by input received from the customer indicating the rollback condition, such as an error rate, via a user interface provided by the service provider.

At 908, the process 900 can include determining that the rollback condition is satisfied based at least partly on an error rate for requests to execute the second version of the code for the function. In some implementations, the requests to execute the second version of the function can be provided via an online tool to design mobile device applications. In particular, the requests can be related to triggers or events of a mobile application created via the online tool. At 910, the function can be executed utilizing the first version of the code for subsequent requests to execute the function. In this way, the rollback condition causes the version of the code of the function to be rolled back from the second version of the code to the first version of the code. The process 900 then ends at 912.

FIG. 10 is a flow diagram showing aspects of a process 1000 to rollback a version of an API to a previous version based on rollback conditions being satisfied, according to one particular configuration. The process 1000 begins at 1002 where a service provider provides an online tool to design an API. The online tool can be used to design, test, and maintain APIs. In some cases, the online tool can provide a first stage for development and testing of APIs and a second stage for making the APIs available for use. The API can be created in conjunction with a mobile application development tool of the service provider and calls of the API can correspond to requests from a computing device executing a mobile device application created via the mobile application development tool.

At 1004, the process 1000 can include updating, via the online tool, a first version of the API to a second version of the API. Additionally, at 1006, the process 1000 includes causing the second version of the API to be accessible to a plurality of computing devices. In some configurations, before updating the first version of the API, the first version of the API is utilized in conjunction with both the first stage and the second stage of the online tool. Additionally, after updating the second version of the API, the second version of the API can be utilized in conjunction with the first stage of the online tool and the first version of the API can be utilized in conjunction with the second stage of the online tool. Further, after testing of the second version of the API, the second version of the API can be utilized in conjunction with the second stage of the online tool.

In particular implementations, first calls of the first version of the API cause execution of a first version of a function of the customer and second calls of the second version of the API cause execution of a second version of the function of the customer. In addition, based at least partly on the first version of the API being updated to the second version of the API, the second version of the function can be executed in conjunction with the first stage of the online tool and the first version of the function can be utilized in conjunction with the second stage of the online tool. Further, after testing of the second version of the API, the second version of the API can be executed in conjunction with the second stage of the online tool. The first version of the function and the second version of the function, in some implementations, can be stored in cloud-based storage of the service provider and stored in association with an account of the customer with the service provider.

At 1008, the process 1000 includes determining a rollback condition for the second version of the API. As explained previously, the rollback condition can be determined based on input received from the customer and/or via machine learning techniques. At 1010, the process 1000 includes receiving a plurality of requests corresponding to second calls of the second version of the API and, at 1012, the process 1000 includes determining that a rollback condition has been satisfied based on an error rate of API calls of the second version of the API. Based at least partly on the rollback condition being satisfied, the first version of the API can be utilized in conjunction with the second stage of the online tool instead of the second version of the API. Additionally, when the calls of the API are related to execution of a function stored by a cloud-based storage system, based at least partly on the rollback condition being satisfied, the first version of the function can be executed in conjunction with the second stage of the online tool rather than the second version of the function.

At 1014, the process 1000 includes providing notification to utilize the first version of the API instead of the second version of the API. In particular computing devices that had accessed or obtained the second version of the API can receive information indicating that the computing devices should switch back to utilizing calls of the first version of the API. At 1016, the process 1000 ends.

FIG. 11 is a flow diagram showing aspects of a process 1100 to rollback a configuration of a computing resource that has been updated based on a rollback condition being satisfied, according to one particular configuration. The process 1100 begins at 1102, with determining that a configuration of a computing resource of a customer of a service provider network has been updated. In some cases, the computing resource is implemented in conjunction with providing a service for an end-user device associated with the customer. Further, the computing resource can be implemented in conjunction with providing a service to a group of end-user devices of the customer of the service provider and the rollback condition corresponds to an operating condition of the group of end-user devices.

At 1104, the process 1100 includes determining that the computing resource is associated with a tag. The tag can indicate that the configuration of the computing resource can revert to a previous version of the configuration based on a rollback condition being satisfied. In some cases, the tag can be associated with a rollback feature. In these scenarios, a first user interface can be provided indicating that a rollback feature applies to the computing resource and indicating an option selectable to enable the rollback feature. Additionally, in response to input indicating selection of the option to enable the rollback feature, a second user interface can be provided including one or more user interface elements to set an alarm to trigger modification of the configuration of the computing resource to the previous version of the configuration based at least partly on the rollback condition being satisfied. In various implementations, the rollback condition can correspond to an availability of the computing resource to the end-user device. In other implementations, the rollback condition can correspond to compliance with one or more features of a network security protocol.

At 1106, the process 1100 includes monitoring the computing resource after the computing resource has been updated. The computing resource can be monitored for at least one of a period of time after the computing resource is updated or a number of additional requests obtained by the service provider network corresponding to the computing resource.

At 1108, the process 1100 includes determining that a rollback condition has been satisfied. In various implementations, the rollback condition can be based at least partly on an alarm associated with an account of the customer with the service provider network and the configuration of the computing resource is modified to the previous version in response to the alarm being triggered. In various implementations, a user interface can be provided indicating that the configuration of the computing resource is to be modified to the previous version of the configuration in response to the alarm being triggered. In some situations, a notification can be made available to the customer that the rollback condition has been triggered. In situations where the computing resource is implemented in conjunction with providing a service to a group of end-user devices of the customer of the service provider, information can be obtained from individual end-user devices of the group of end-user device indicating measurements of the operating condition for the individual end-user devices and the rollback condition can be satisfied based at least partly on the measurements of the operating condition being outside of a threshold range for the operating condition.

In particular implementations, the rollback condition can be identified using one or more machine learning techniques. For example, one or more machine-learning techniques can be utilized to produce a model. The model can indicate the rollback condition and be utilized during the monitoring of the computing resource to determine that the rollback condition has been satisfied. To illustrate, the model can be produced by the one or more machine-learning techniques for one or more types of requests received when the configuration of the computing resource corresponds to the first version of the configuration. In an illustrative example, the model can be based at least partly on an error rate of at least one type of request. In a particular illustrative example, the model can be based at least partly on the measured historical error rate of a specific combination of resource path and HTTP method type in a representational state transfer (REST) API. After producing the model, the requests received by a service provider network when the configuration of the computing resource is the second configuration can be evaluated with respect to the model to determine whether or not the rollback condition has been satisfied.

At 1110, the process 1100 includes modifying the configuration of the computing resource to the previous version of the configuration. In some implementations, input can be obtained from the customer to perform an additional modification of the computing resource to an additional configuration of the computing resource after modifying the configuration of the computing resource to the previous version of the configuration. In these situations, the input can be related to performing the additional modification during a specified period of time after modifying the configuration of the computing resource to the previous version of the configuration and a notification can be made available to the customer that the additional modification is prohibited until the specified period of time expires. In other implementations, the input can be related to performing the additional modification during a specified period of time after modifying the configuration of the computing resource to the previous version of the configuration and a user interface can be provided including an option selectable to override a rule that the additional modification is prohibited until the specified period of time expires. The process 1100 ends at 1112.

Figure 12:
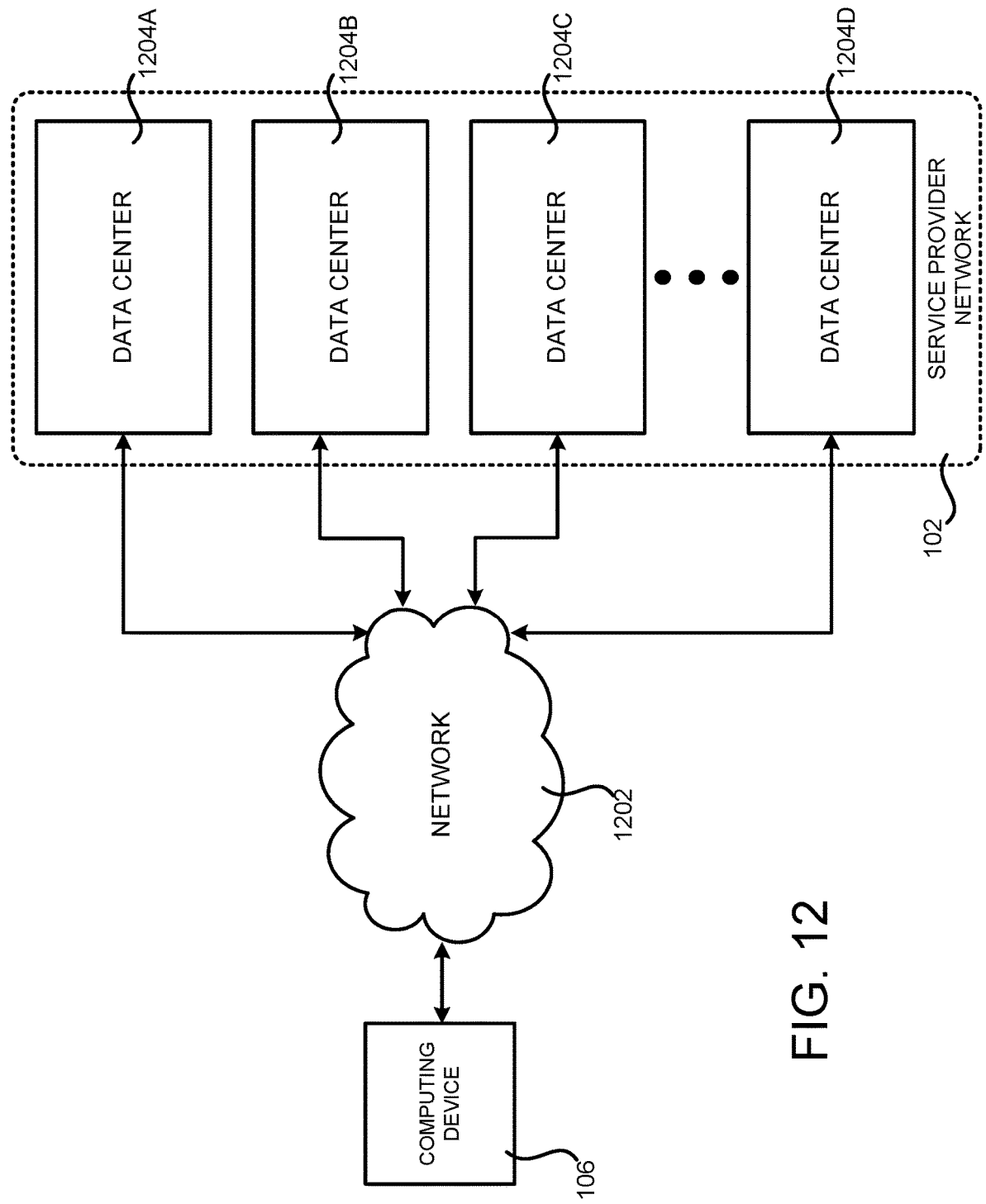
FIG. 12 is a system and network diagram that shows an illustrative operating environment that includes a service provider network that can be configured to implement aspects of the functionality described herein.

FIG. 12 is a system and network diagram that shows one illustrative operating environment for the configurations disclosed herein that includes a service provider network 102 that can be configured to execute the storage service 100, the serverless computing environment 202, the mobile application development tool 204, the API development tool 206, the monitoring system 122, the auto-rollback system 124, the code deployment architecture 212, and the other network services described herein, according to one particular configuration. As discussed briefly above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can be data storage resources, data processing resources, such as VM instances, networking resources, data communication resources, network services, and other types of resources.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 are enabled in one implementation by one or more data centers 1204A-1204D (which might be referred to herein singularly as "a data center 1204" or collectively as "the data centers 1204"). The data centers 1204 are facilities utilized to house and operate computer systems and associated components. The data centers 1204 typically include redundant and backup power, communications, cooling, and security systems. The data centers 1204 can also be located in geographically disparate locations. One illustrative configuration for a data center 1204 that can be utilized to implement the technologies disclosed herein will be described below with regard to FIG. 13.

The users of the service provider network 102 can access the computing resources provided by the service provider network 102 over a network 1202, which can be a wide area communication network ("WAN"), such as the Internet, an intranet or an Internet service provider ("ISP") network or a combination of such networks. For example, and without limitation, a computing device 104 operated by a user of the service provider network 102 can be utilized to access the service provider network 102 by way of the network 1202. It should be appreciated that a local-area network ("LAN"), the Internet, or any other networking topology known in the art that connects the data centers 1204 to remote customers and other users can be utilized. It should also be appreciated that combinations of such networks can also be utilized.

Figure 13:
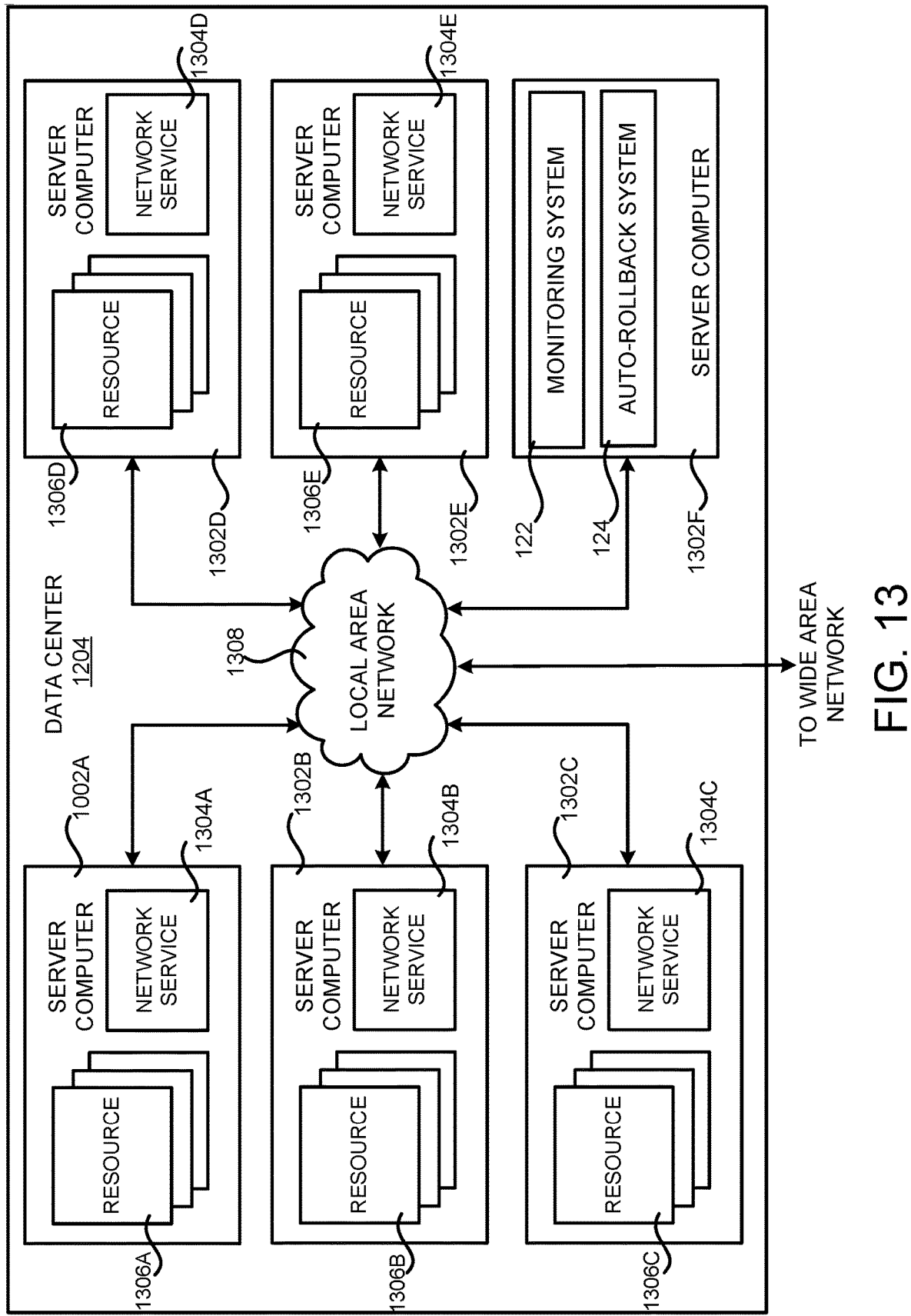
FIG. 13 is a computing system diagram illustrating a configuration for a data center that can be utilized to implement aspects of the technologies disclosed herein.

FIG. 13 is a computing system diagram that illustrates one configuration for a data center 1204 that can be utilized to implement the storage service 100, the monitoring system 122, the auto-rollback system 124, and the other network services disclosed herein. The example data center 1204 shown in FIG. 13 includes several server computers 1302A-1302E (which might be referred to herein singularly as "a server computer 1302" or in the plural as "the server computers 1302") for providing the computing resources 1306A-1306E, respectively.

The server computers 1302 can be standard tower, rack-mount, or blade server computers configured appropriately for providing the various computing resources described herein (illustrated in FIG. 13 as the computing resources 1306A-1306E). As mentioned above, the computing resources 1306 provided by the service provider network 102 can be data storage resources, data processing resources such as VM instances or hardware computing systems, database resources, networking resources, and others. Some of the servers 1302 can also be configured to execute network services 1304A-1304E capable of instantiating, providing and/or managing the computing resources 1306, some of which are described in detail herein.

The data center 1204 shown in FIG. 13 also includes a server computer 1302F that can execute some or all of the software components described above. For example, and without limitation, the server computer 1302F can be configured to execute the monitoring system 122 and the auto-rollback system 124, both of which were described in detail above. The server computer 1302F can also be configured to execute other components and/or to store data for providing some or all of the functionality described herein. In this regard, it should be appreciated that components or different instances of the monitoring system 122 and the auto-rollback system 124 can execute on many other physical or virtual servers in the data centers 1204 in various configurations.

In the example data center 1204 shown in FIG. 13, an appropriate LAN 1308 is also utilized to interconnect the server computers 1302A-1302F. The LAN 1308 is also connected to the network 1202 illustrated in FIG. 12. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 1204A-1204D, between each of the server computers 1302A-1302F in each data center 1204, and, potentially, between computing resources 1306 in each of the data centers 1204. It should be appreciated that the configuration of the data center 1204 described with reference to FIG. 13 is merely illustrative and that other implementations can be utilized.

Figure 14:
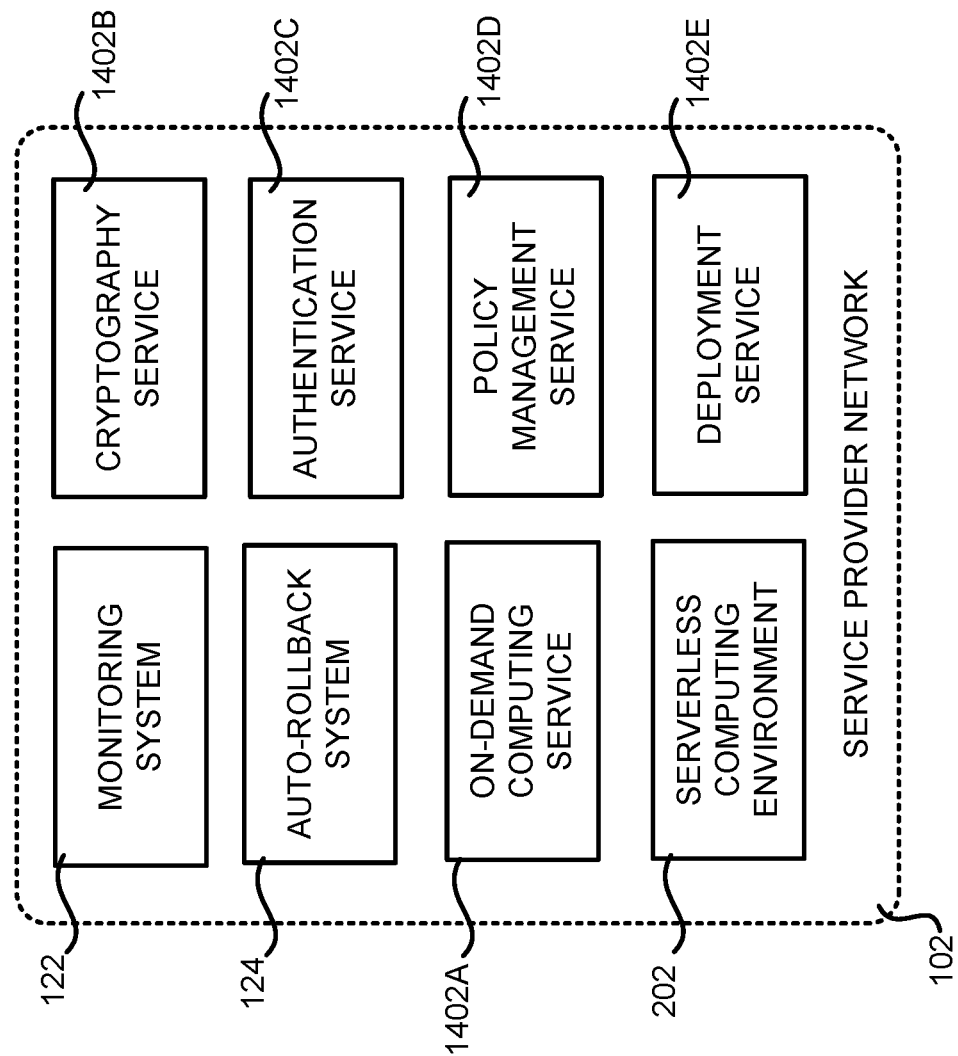
FIG. 14 is a network services diagram that shows aspects of several services that can be provided by and utilized within a service provider network configured to implement the various technologies disclosed herein.

FIG. 14 is a system and network diagram that shows aspects of several network services that can be provided by and utilized within a service provider network 102 in one configuration disclosed herein. In particular, and as discussed above, the service provider network 102 can provide a variety of network services to customers and other users of the service provider network 102 including, but not limited to, the monitoring system 122, the auto-rollback system 124, an on-demand computing service 1402A, a serverless computing environment 202, a cryptography service 1402C, an authentication service 1402D, a policy management service 1402E, and a deployment service 1402F. The service provider network 102 can also provide other types of network services, some of which are described below.

It is to be appreciated that users of the service provider network 102 can include organizations or individuals that utilize some or all of the network services provided by the service provider network 102. As described above, users such as the user 108 can communicate with the service provider network 102 using an appropriate computing device 106 through a network, such as the network 1202 shown in FIG. 12.

It is also noted that not all configurations described include the network services shown in FIG. 14 and that additional network services can be provided in addition to, or as an alternative to, the services explicitly described herein. Each of the services shown in FIG. 14 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 14 will now be provided.

The on-demand computing service 1402A can be a collection of computing resources configured to instantiate VM instances and to provide other types of computing resources 1306 on demand. For example, a user of the service provider network 102 can interact with the on-demand computing service 1402A (via appropriately configured and authenticated API calls, for example) to provision and operate VM instances that are instantiated on physical computing devices hosted and operated by the service provider network 102. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 1402A is shown in FIG. 14, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The serverless computing environment 202 is a network service that allows users to execute code (which might be referred to herein as a "function") without provisioning or managing server computers in the service provider network 102. Rather, the serverless computing environment 202 can automatically run code in response to the occurrence of events. The code that is executed can be stored by the data store 110, the cloud-based storage system 502, the cloud-based storage system 702, or in another network accessible location.

In this regard, it is to be appreciated that the term "serverless computing environment" as used herein is not intended to infer that servers are not utilized to execute the program code, but rather that the serverless computing environment 202 enables code to be executed without requiring a user to provision or manage server computers. The serverless computing environment 202 executes program code only when needed, and only utilizes the resources necessary to execute the code. In some configurations, the user or entity requesting execution of the code might be charged only for the amount of time required for each execution of their program code.

The service provider network 102 can also include a cryptography service 1402C. The cryptography service 1402C can utilize storage services of the service provider network 102 to store encryption keys in encrypted form, whereby the keys can be usable to decrypt user keys accessible only to particular devices of the cryptography service 1402C. The cryptography service 1402C can also provide other types of functionality not specifically mentioned herein.

As illustrated in FIG. 14 and discussed above, the service provider network 102, in various configurations, also includes an authentication service 1402D and a policy management service 1402E. The authentication service 1402D, in one example, is a computer system (i.e., collection of computing resources 1306) configured to perform operations involved in authentication of users. For instance, one of the services shown in FIG. 14 can provide information from a user to the authentication service 1402D to receive information in return that indicates whether or not the requests submitted by the user are authentic.

The policy management service 1402E, in one example, is a network service configured to manage policies on behalf of users of the service provider network 102. The policy management service 1402E can include an interface (e.g.

API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The service provider network 102 can additionally maintain other network services based, at least in part, on the needs of its customers. For instance, the service provider network 102 can maintain a deployment service 1402F for deploying program code in some configurations. The deployment service 1402F provides functionality for deploying program code, such as to virtual or physical hosts provided by the on-demand computing service 1402A. Other services include, but are not limited to, database services, object-level archival data storage services, and services that manage, monitor, interact with, or support other services. The service provider network 102 can also be configured with other network services not specifically mentioned herein in other configurations.

Figure 15:
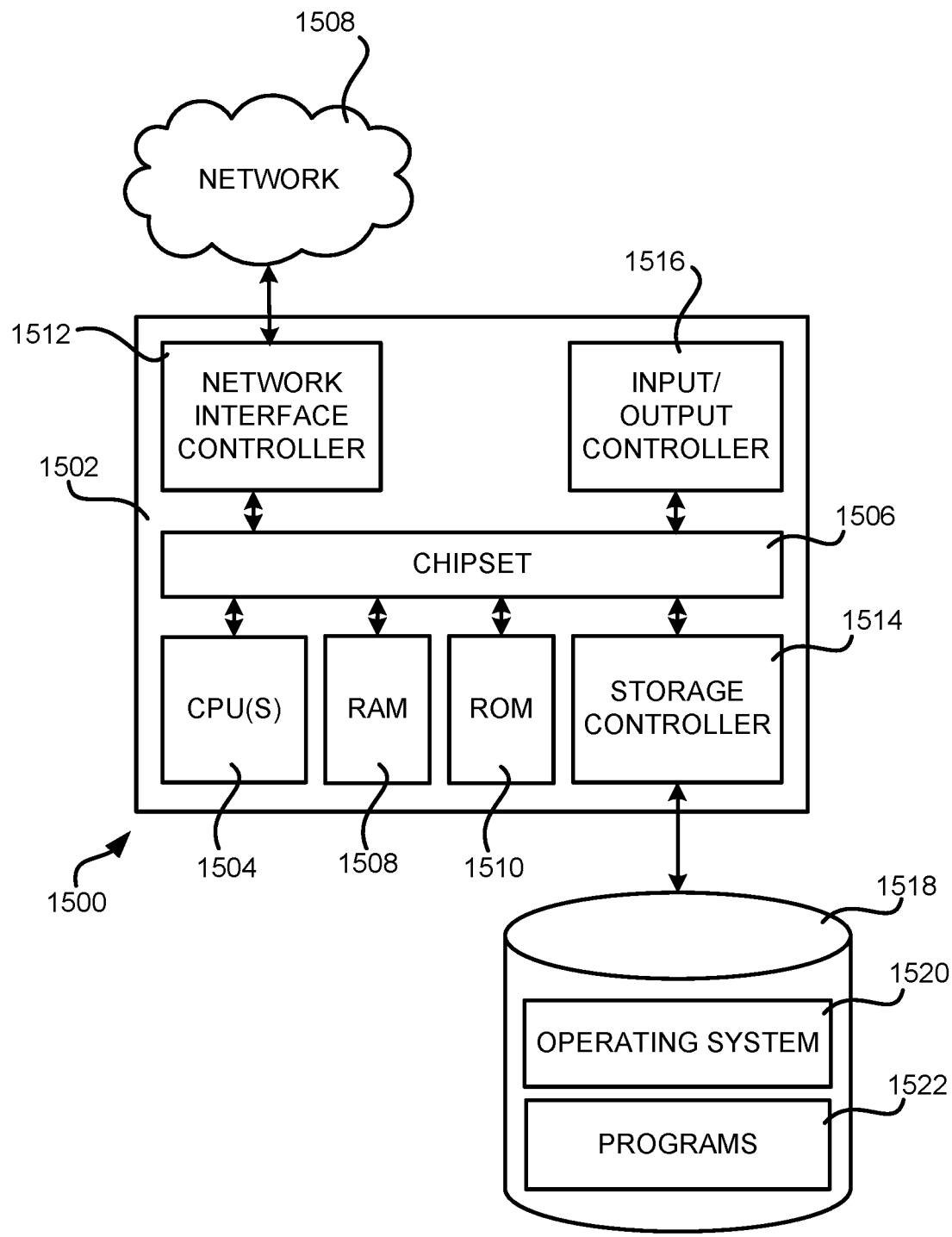
FIG. 15 is a computer architecture diagram showing an illustrative computer hardware architecture for implementing a computing device that can be utilized to implement aspects of the various technologies presented herein.

FIG. 15 shows an example computer architecture for a computer 1500 capable of executing program components for implementing the functionality described above. The computer architecture shown in FIG. 15 illustrates a conventional server computer, workstation, desktop computer, laptop, tablet, network appliance, e-reader, smartphone, or other computing device, and can be utilized to execute any of the software components presented herein.

The computer 1500 includes a baseboard 1502, or "motherboard," which is a printed circuit board to which a multitude of components or devices can be connected by way of a system bus or other electrical communication paths. In one illustrative configuration, one or more central processing units ("CPUs") 1504 operate in conjunction with a chipset 1506. The CPUs 1504 can be standard programmable processors that perform arithmetic and logical operations necessary for the operation of the computer 1500.

The CPUs 1504 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1506 provides an interface between the CPUs 1504 and the remainder of the components and devices on the baseboard 1502. The chipset 1506 can provide an interface to a RAM 1508, used as the main memory in the computer 1500. The chipset 1506 can further provide an interface to a computer-readable storage medium such as a read-only memory ("ROM") 1510 or non-volatile RAM ("NVRAM") for storing basic routines that help to startup the computer 1500 and to transfer information between the various components and devices. The ROM 1510 or NVRAM can also store other software components necessary for the operation of the computer 1500 in accordance with the configurations described herein.

The computer 1500 can operate in a networked environment using logical connections to remote computing devices and computer systems through a network, such as the network 1508. The chipset 1506 can include functionality for providing network connectivity through a NIC 1512, such as a gigabit Ethernet adapter. The NIC 1512 is capable of connecting the computer 1500 to other computing devices over the network 1508. It should be appreciated that multiple NICs 1512 can be present in the computer 1500, connecting the computer to other types of networks and remote computer systems.

The computer 1500 can be connected to a mass storage device 1518 that provides non-volatile storage for the computer. The mass storage device 1518 can store an operating system 1520, programs 1522, and data, which have been described in greater detail herein. The mass storage device 1518 can be connected to the computer 1500 through a storage controller 1514 connected to the chipset 1506. The mass storage device 1518 can consist of one or more physical storage units. The storage controller 1514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1500 can store data on the mass storage device 1518 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1518 is characterized as primary or secondary storage, and the like.

For example, the computer 1500 can store information to the mass storage device 1518 by issuing instructions through the storage controller 1514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1500 can further read information from the mass storage device 1518 by detecting the physical states or characteristics of one or more particular locations within the physical storage units.

In addition to the mass storage device 1518 described above, the computer 1500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1518 can store an operating system 1520 utilized to control the operation of the computer 1500. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1518 can store other system or application programs and data utilized by the computer 1500.

In one configuration, the mass storage device 1518 or other computer-readable storage media is encoded with computer-executable instructions which, when loaded into the computer 1500, transform the computer from a general-purpose computing system into a special-purpose computer capable of implementing the configurations described herein. These computer-executable instructions transform the computer 1500 by specifying how the CPUs 1504 transition between states, as described above. According to one configuration, the computer 1500 has access to computer-readable storage media storing computer-executable instructions which, when executed by the computer 1500, perform the various processes described above with regard to FIGS. 1-11. The computer 1500 can also include computer-readable storage media for performing any of the other computer-implemented operations described herein.

The computer 1500 can also include one or more input/output controllers 1516 for receiving and processing input from a number of input devices, such as a keyboard, a mouse, a touchpad, a touch screen, an electronic stylus, or other type of input device. Similarly, an input/output controller 1516 can provide output to a display, such as a computer monitor, a flat-panel display, a digital projector, a printer, or other type of output device. It will be appreciated that the computer 1500 might not include all of the components shown in FIG. 15, can include other components that are not explicitly shown in FIG. 15, or can utilize an architecture completely different than that shown in FIG. 15.

Based on the foregoing, it should be appreciated that technologies for providing a system to modify a configuration of a tagged computing resource in response to detecting a rollback condition during a rollback window have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
one or more processors; and
at least one non-transitory computer-readable storage medium having instructions stored thereupon which, when executed by the one or more processors, cause the system to perform operations comprising:
providing a computing resource to a customer of a service provider network, wherein the computing resource is utilized to at least one of store information or perform computations on behalf of the customer;
determining that a configuration of the computing resource has been updated from a first version of the configuration to a second version of the configuration;
determining that the computing resource is associated with a tag, wherein the tag indicates that, after being updated, the configuration of the computing resource is to revert to a previous version of the configuration based on a rollback condition being satisfied;
based on the computing resource being associated with the tag, monitoring the computing resource during a rollback window, wherein the rollback window includes at least one of a period of time after the computing resource is updated or a number of requests executing the second version of the computing resource;
obtaining requests corresponding to the computing resource during the rollback window;
determining that a portion of the requests return an error and that the portion of the requests that return the error satisfies a threshold number of requests;
determining that the rollback condition has been satisfied; and
modifying the configuration of the computing resource from the second version of the configuration back to the first version of the configuration based at least on the rollback condition being satisfied.

2. The system of claim 1, wherein:
the operations further comprise:
providing a user interface including a first user interface element indicating that a rollback feature applies to the computing resource and a second user interface element selectable to activate the rollback feature; and
receiving the input of the customer via the second user interface element to activate the rollback feature; and
the computing resource is monitored during the rollback window based at least in part on receiving the input of the customer.

3. The system of claim 1, wherein:
the service provider network provides a monitoring system that enables activation of alarms by customers of the service provider network; and
the rollback condition corresponds to an alarm of the monitoring system.

4. The system of claim 1, wherein the operations further comprise:
producing a model for one or more types of requests received when the configuration of the computing resource is the first version of the configuration, wherein the model is produced using one or more machine-learning techniques; and
determining that the rollback condition has been satisfied is based at least in part on utilizing the model during monitoring of the computing resource when the configuration of the computing resource is the second version of the configuration.

5. A computer-implemented method, comprising:
- determining that a configuration of a computing resource of a customer of a service provider network has been updated;
- determining that the computing resource is associated with a tag, wherein the tag indicates that, after being updated, the configuration of the computing resource is to revert to a previous version of the configuration based on a rollback condition being satisfied;
- based on the computing resource being associated with the tag, monitoring the computing resource for the rollback condition after the computing resource has been updated;
- obtaining requests corresponding to the computing resource during the monitoring;
- determining that a portion of the requests return an error;
- determining that the rollback condition has been satisfied, based at least in part on the portion of the requests that return the error; and
- modifying, based at least on the rollback condition being satisfied, the configuration of the computing resource back to the previous version of the configuration.

6. The computer-implemented method of claim 5, wherein the computing resource is monitored for at least one of:
- a period of time after the computing resource is updated; or
- a number of additional requests obtained by the service provider network corresponding to the computing resource.

7. The computer-implemented method of claim 5, wherein:
- the rollback condition is based at least on an alarm associated with an account of the customer with the service provider network; and
- the configuration of the computing resource is modified to the previous version in response to the alarm being triggered.

8. The computer-implemented method of claim 7, wherein the method further comprises providing a user interface indicating that the configuration of the computing resource is to be modified to the previous version of the configuration in response to the alarm being triggered.

9. The computer-implemented method of claim 5, wherein the method further comprises:
- providing a first user interface indicating that a rollback feature applies to the computing resource and indicating an option selectable to enable the rollback feature;
- receiving an input indicating selection of the option to enable the rollback feature; and
- providing, in response to receiving the input, a second user interface including one or more user interface elements to set an alarm to trigger modification of the configuration of the computing resource to the previous version of the configuration based at least on the rollback condition being satisfied.

10. The computer-implemented method of claim 5, further comprising:
- determining that an additional computing resource of the customer of the service provider network has been updated;
- determining that the additional computing resource is associated with an additional tag, wherein the additional tag indicates that, after being updated an additional configuration of the additional computing resource reverts to a previous version of the additional configuration based on an additional rollback condition being satisfied;
- monitoring the additional computing resource after the additional computing resource has been updated;
- determining that the additional rollback condition is not satisfied during an additional rollback window; and
- discontinuing monitoring the additional computing resource based at least on the additional rollback condition not being satisfied during the additional rollback window.

11. The computer-implemented method of claim 5, wherein the computing resource is implemented in conjunction with providing a service for an end-user device associated with the customer.

12. The computer-implemented method of claim 11, wherein the rollback condition corresponds to an availability of the computing resource to the end-user device.

13. The computer-implemented method of claim 5, wherein the rollback condition corresponds to compliance with one or more features of a network security protocol.

14. A system, comprising:
- one or more processors; and
- at least one non-transitory computer-readable storage medium having instructions stored thereupon which, when executed by the one or more processors, cause the system to perform operations comprising:
  - determining that a configuration of a computing resource of a customer of a service provider network has been updated;
  - determining that the computing resource is associated with a tag, wherein the tag indicates that, after being updated, the configuration of the computing resource is to revert to a previous version of the configuration based on a rollback condition being satisfied;
  - based on the computing resource being associated with the tag, monitoring the computing resource for the rollback condition after the computing resource has been updated;
  - obtaining requests corresponding to the computing resource during the monitoring;
  - determining that a portion of the requests return an error;
  - determining that the rollback condition has been satisfied, based at least in part on the portion of the requests that return the error; and
  - modifying, based at least on the rollback condition being satisfied, the configuration of the computing resource to the previous version of the configuration.

15. The system of claim 14, wherein the operations further comprise sending a notification to the customer, the notification indicating that the rollback condition has been triggered.

16. The system of claim 14, wherein the operations further comprise obtaining input from the customer to perform an additional modification of the computing resource to an additional configuration of the computing resource after modifying the configuration of the computing resource to the previous version of the configuration.

17. The system of claim 16, wherein the operations further comprise:
- determining that the input is obtained to perform the additional modification during a specified period of time after modifying the configuration of the computing resource to the previous version of the configuration; and making a notification available to the customer that the additional modification is prohibited until the specified period of time expires.

18. The system of claim 16, wherein the operations further comprise:
   determining that the input is obtained to perform the additional modification during a specified period of time after modifying the configuration of the computing resource to the previous version of the configuration; and
   providing a user interface including an option selectable to override a rule that the additional modification is prohibited until the specified period of time expires.

19. The system of claim 14, wherein:
   the computing resource is implemented in conjunction with providing a service to a group of end-user devices of the customer of the service provider; and
   the rollback condition corresponds to an operating condition of the group of end-user devices.

20. The system of claim 19, wherein the operations further comprise:
   obtaining information from individual end-user devices of the group of end-user devices indicating measurements of the operating condition for the individual end-user devices; and
   determining that the rollback condition has been satisfied based at least on the measurements of the operating condition being outside of a threshold range for the operating condition.

* * * * *